(12) United States Patent
Neufarth et al.

(10) Patent No.: US 12,077,339 B2
(45) Date of Patent: *Sep. 3, 2024

(54) BLOW MOLDED ARTICLE WITH VISUAL EFFECTS

(71) Applicant: The Procter & Gamble Company, Cincinnati, OH (US)

(72) Inventors: Bradley Scott Neufarth, Loveland, OH (US); Andrew Joseph Horton, Middletown, OH (US); Marc Andrew Mamak, Mason, OH (US); Mark Lewis Agerton, Mason, OH (US); Philip Andrew Sawin, Cincinnati, OH (US); Ioannis Constantine Constantinides, Wyoming, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 150 days.

This patent is subject to a terminal disclaimer.

(21) Appl. No.: 17/217,751

(22) Filed: Mar. 30, 2021

(65) Prior Publication Data

US 2021/0221551 A1 Jul. 22, 2021

Related U.S. Application Data

(63) Continuation of application No. 16/158,841, filed on Oct. 12, 2018, now Pat. No. 10,994,886.

(30) Foreign Application Priority Data

Oct. 12, 2017 (EP) .................................... 17196087

(51) Int. Cl.
*B65D 1/02* (2006.01)
*B29B 11/14* (2006.01)
(Continued)

(52) U.S. Cl.
CPC ............ *B65D 1/0215* (2013.01); *B29B 11/14* (2013.01); *B29C 49/06* (2013.01);
(Continued)

(58) Field of Classification Search
CPC ....... B65D 1/0215; B29B 11/14; B29C 49/06; B29C 2949/3018; B29C 2949/3032;
(Continued)

(56) References Cited

U.S. PATENT DOCUMENTS 1,554,191 A   9/1925  Alexander
3,222,439 A  12/1965  Bolomey et al.
(Continued)

FOREIGN PATENT DOCUMENTS

CN   1538995 A   10/2004
CN   1673284 A    9/2005
(Continued)

OTHER PUBLICATIONS

All final and non-final office actions for U.S. Appl. No. 16/158,841.
(Continued)

*Primary Examiner* — James C Yager
(74) *Attorney, Agent, or Firm* — Jay A. Krebs; Alexandra S. Anoff

(57) ABSTRACT

A blow molded article obtained by blow molding of a preform made via parallel flow coinjection, having a wall formed by 3 layers in at least a region wherein the outside layer is transparent and the inner layer comprises an effect pigment visible through the transparent layer. Articles according to the invention have an improved gloss, low haze and higher resistance to delamination than previous articles. The invention relates also to preforms for making articles as described and to methods for making preforms and articles.

9 Claims, 11 Drawing Sheets

(51) Int. Cl.
  *B29C 49/06* (2006.01)
  *B29K 67/00* (2006.01)
  *B29K 105/00* (2006.01)
  *B29L 31/00* (2006.01)

(52) U.S. Cl.
  CPC ............... *B29C 2949/3018* (2022.05); *B29C 2949/3032* (2022.05); *B29C 2949/3036* (2022.05); *B29K 2067/003* (2013.01); *B29K 2105/0032* (2013.01); *B29K 2995/0018* (2013.01); *B29K 2995/002* (2013.01); *B29L 2031/7158* (2013.01); *Y10T 428/1352* (2015.01); *Y10T 428/139* (2015.01); *Y10T 428/1393* (2015.01)

(58) Field of Classification Search
  CPC .... B29C 2949/3036; B29C 2949/0715; B29C 49/071; B29K 2067/003; B29K 2105/0032; B29K 2995/0018; B29K 2995/002; B29L 2031/7158; Y10T 428/1352; Y10T 428/139; Y10T 428/1393
  See application file for complete search history.

(56) References Cited

U.S. PATENT DOCUMENTS

| | | |
|---|---|---|
| 3,420,924 A | 1/1969 | Mason et al. |
| 3,550,197 A | 12/1970 | Szajna et al. |
| 4,174,413 A | 11/1979 | Kataoka et al. |
| 4,421,560 A | 12/1983 | Kito et al. |
| 4,457,961 A | 7/1984 | Nakazawa |
| 4,535,901 A | 8/1985 | Okudaira |
| 4,728,549 A | 3/1988 | Shimizu et al. |
| 4,868,026 A | 9/1989 | Shimizu |
| 4,919,983 A | 4/1990 | Fremin |
| 4,957,949 A | 9/1990 | Kamada et al. |
| 4,994,313 A | 2/1991 | Shimizu |
| 5,431,697 A | 7/1995 | Kamata et al. |
| 5,595,799 A | 1/1997 | Beck et al. |
| 5,628,950 A | 5/1997 | Schrenk et al. |
| 5,628,957 A | 5/1997 | Collette et al. |
| 5,712,009 A | 1/1998 | Moore et al. |
| 5,849,224 A | 12/1998 | Valyi |
| 5,927,525 A | 7/1999 | Darr et al. |
| 6,123,211 A | 9/2000 | Rashid et al. |
| 6,129,960 A | 10/2000 | Kudert et al. |
| 6,294,602 B1 | 9/2001 | Shimo et al. |
| 6,296,911 B1 | 10/2001 | Catarineu |
| 6,344,249 B1 | 2/2002 | Maruyama |
| 6,405,867 B1 | 6/2002 | Moore |
| 6,562,276 B1 | 5/2003 | Shelby et al. |
| 6,596,213 B2 | 7/2003 | Swenson |
| 6,663,822 B1 | 12/2003 | Cargill |
| 6,737,132 B1 | 5/2004 | Michihata et al. |
| 6,815,080 B2 | 11/2004 | Omori |
| 6,878,774 B2 | 4/2005 | Kikuchi et al. |
| 6,911,266 B1 | 6/2005 | Skov |
| 6,929,136 B2 | 8/2005 | Salazar-Ieal |
| 6,929,836 B2 | 8/2005 | Kikuchi |
| 7,534,829 B2 | 5/2009 | Tai et al. |
| 7,662,466 B2 | 2/2010 | Seeboth et al. |
| 7,828,890 B2 | 11/2010 | Henglein |
| 7,837,048 B2 | 11/2010 | Lusker |
| 7,906,054 B2 | 3/2011 | Hirschfelder et al. |
| 8,061,540 B2 | 11/2011 | Toyoda |
| 8,097,317 B2 | 1/2012 | Katou |
| 8,124,234 B2 | 2/2012 | Weaver et al. |
| 8,485,935 B2 | 7/2013 | Hecht |
| 8,535,595 B2 | 9/2013 | Meiki et al. |
| 8,580,365 B2 | 11/2013 | Abe |
| 8,734,923 B2 | 5/2014 | Shi |
| 8,883,920 B2 | 11/2014 | Inoue et al. |
| 8,895,120 B2 | 11/2014 | Dierickx |
| 8,968,147 B2 | 3/2015 | Hecht |
| 9,000,068 B2 | 4/2015 | Trummer |
| 9,114,895 B2 | 8/2015 | Sato et al. |
| 9,162,429 B2 | 10/2015 | Suga et al. |
| 9,597,825 B2 | 3/2017 | Schmidt et al. |
| 9,708,092 B2 | 7/2017 | Bowen et al. |
| 9,731,482 B2 | 8/2017 | Arakawa et al. |
| 9,862,157 B2 | 1/2018 | Hosokoshiyama |
| 10,279,948 B2 | 5/2019 | Yang et al. |
| 10,518,922 B2 | 12/2019 | Yang et al. |
| 11,046,473 B2 | 6/2021 | Agerton et al. |
| 2002/0009565 A1 | 1/2002 | Fehn |
| 2004/0146675 A1 | 7/2004 | Hashimoto et al. |
| 2004/0194663 A1 | 10/2004 | Li |
| 2005/0011892 A1 | 1/2005 | Nakajima |
| 2005/0142309 A1 | 6/2005 | Goto et al. |
| 2005/0170113 A1 | 8/2005 | Hill |
| 2005/0170114 A1 | 8/2005 | Hill |
| 2005/0287323 A1 | 12/2005 | Akiyama et al. |
| 2006/0029823 A1* | 2/2006 | Brown ............... B32B 1/02 428/480 |
| 2006/0156957 A1 | 7/2006 | Fuller |
| 2006/0263554 A1 | 11/2006 | Yamada et al. |
| 2007/0228598 A1 | 10/2007 | Akiyama |
| 2008/0017076 A1 | 1/2008 | Noguchi |
| 2008/0047470 A1 | 2/2008 | Pfaff |
| 2008/0193787 A1 | 8/2008 | Dierickx |
| 2008/0241447 A1 | 10/2008 | Shi |
| 2008/0317989 A1 | 12/2008 | Abe et al. |
| 2009/0233026 A1 | 9/2009 | Akiyama |
| 2010/0028577 A1 | 2/2010 | Siegl |
| 2010/0206784 A1 | 8/2010 | Weaver et al. |
| 2010/0307633 A1 | 12/2010 | Dierickx |
| 2011/0100857 A1 | 5/2011 | Wang et al. |
| 2012/0165422 A1 | 6/2012 | Vernon et al. |
| 2012/0171401 A1 | 7/2012 | Katou |
| 2012/0256356 A1 | 10/2012 | Akiyama |
| 2013/0069268 A1 | 3/2013 | Liu et al. |
| 2013/0273287 A1 | 10/2013 | Luo et al. |
| 2013/0313217 A1 | 11/2013 | Yamamoto et al. |
| 2014/0044904 A1 | 2/2014 | De Belder |
| 2014/0054255 A1 | 2/2014 | Hosokoshiyama |
| 2014/0119813 A1 | 5/2014 | Moselage |
| 2015/0079320 A1 | 3/2015 | Katou |
| 2015/0105532 A1 | 4/2015 | Allen |
| 2016/0017092 A1 | 1/2016 | Iwamoto et al. |
| 2016/0368649 A1 | 12/2016 | Eschenburg |
| 2017/0021552 A1 | 1/2017 | Dygert |
| 2017/0197351 A1 | 7/2017 | Chiba |
| 2017/0204251 A1 | 7/2017 | Agerton et al. |
| 2017/0259486 A1 | 9/2017 | Koerner |
| 2018/0002071 A1 | 1/2018 | Hosokoshiyama et al. |
| 2019/0009483 A1 | 1/2019 | Meadows et al. |
| 2019/0105805 A1 | 4/2019 | Dubuque |
| 2019/0112091 A1 | 4/2019 | Neufarth et al. |
| 2019/0143576 A1 | 5/2019 | Chiba et al. |
| 2020/0024021 A1 | 1/2020 | Agerton |
| 2020/0122873 A1 | 4/2020 | Agerton |
| 2020/0171727 A1 | 6/2020 | Witz |
| 2020/0282688 A1 | 9/2020 | Schurr |
| 2020/0324455 A1 | 10/2020 | Agerton |
| 2020/0324456 A1 | 10/2020 | Mamak |
| 2020/0399463 A1 | 12/2020 | Wieloch et al. |
| 2021/0206141 A1 | 7/2021 | Neufarth et al. |
| 2021/0269188 A1 | 9/2021 | Agerton et al. |
| 2021/0316493 A1 | 10/2021 | Mamak et al. |
| 2022/0017254 A1 | 1/2022 | Tanchette |

FOREIGN PATENT DOCUMENTS

| | | |
|---|---|---|
| CN | 1988995 A | 6/2007 |
| CN | 201484752 U | 5/2010 |
| CN | 102026793 A | 4/2011 |
| CN | 102498045 A | 6/2012 |
| CN | 102575076 A | 7/2012 |
| CN | 106573447 A | 4/2017 |
| CN | 107548352 A | 1/2018 |
| CN | 211732096 U | 10/2020 |
| DE | 202004018510 U1 | 9/2005 |
| DE | 102005022633 A1 | 11/2006 |

(56) References Cited

FOREIGN PATENT DOCUMENTS

| | | |
|---|---|---|
| DE | 102013011403 A1 | 1/2015 |
| EP | 0328014 A2 | 8/1989 |
| EP | 0354255 A1 | 2/1990 |
| EP | 1681239 A1 | 7/2006 |
| EP | 2231373 B1 | 7/2015 |
| EP | 2957514 A1 | 12/2015 |
| GB | 201203964 | 4/2012 |
| JP | S5381569 A | 7/1978 |
| JP | S57128520 A | 8/1982 |
| JP | S6294541 A | 5/1987 |
| JP | H0295631 A | 4/1990 |
| JP | H05042641 A | 2/1993 |
| JP | 06171638 A | 6/1994 |
| JP | H06255052 A | 9/1994 |
| JP | H07186190 A | 7/1995 |
| JP | H07205195 A | 8/1995 |
| JP | H08156202 A | 6/1996 |
| JP | 2970292 B2 | 11/1999 |
| JP | 2000264325 A | 9/2000 |
| JP | 3134376 B2 | 2/2001 |
| JP | 2002104362 A | 4/2002 |
| JP | 2004148616 A | 5/2004 |
| JP | 2004203906 A | 7/2004 |
| JP | 2005219760 A | 8/2005 |
| JP | 2005308567 A | 11/2005 |
| JP | 2006168250 A | 6/2006 |
| JP | 2006306470 A | 11/2006 |
| JP | 2006312485 A | 11/2006 |
| JP | 2007223628 A | 6/2007 |
| JP | 2007186190 A | 7/2007 |
| JP | 2007205195 A | 8/2007 |
| JP | 2008156202 A | 7/2008 |
| JP | 2008189314 A | 8/2008 |
| JP | 2008208288 A | 9/2008 |
| JP | 2009062059 A | 3/2009 |
| JP | 4674136 B2 | 1/2011 |
| JP | 5029879 B2 | 9/2012 |
| JP | 2013028137 A | 2/2013 |
| JP | 2015131438 A | 7/2015 |
| JP | 2015131492 A | 7/2015 |
| JP | 3207320 U | 10/2016 |
| JP | 2017036069 A | 2/2017 |
| JP | 2018039536 A | 3/2018 |
| JP | 2018058604 A | 4/2018 |
| JP | 6593187 B2 | 10/2019 |
| KR | 20010047311 A | 6/2001 |
| TW | 201704107 A | 2/2017 |
| TW | 201704108 A | 2/2017 |
| TW | 201706189 A | 2/2017 |
| WO | 2006066825 A2 | 6/2006 |
| WO | 2006127569 A2 | 11/2006 |
| WO | 2007065508 A2 | 6/2007 |
| WO | 2007066508 A1 | 6/2007 |
| WO | 2007098837 A1 | 9/2007 |
| WO | 2016031150 A1 | 3/2016 |
| WO | 2017134099 A1 | 8/2017 |
| WO | 2019133713 A1 | 7/2019 |
| WO | 2020081114 A1 | 4/2020 |

OTHER PUBLICATIONS

All final and non-final office actions for U.S. Appl. No. 16/158,719.
All final and non-final office actions for U.S. Appl. No. 16/381,125.
All final and non-final office actions for U.S. Appl. No. 16/845,283.
All final and non-final office actions for U.S. Appl. No. 16/845,295.
All final and non-final office actions for U.S. Appl. No. 17/144,281.
C-Mold Co-Injection, Chapter 20, Copyright 1996 Advanced CAE Technology, Inc.
European Search Report for 17196087.5 dated 29.03.18.
PCT International Search Report and Written Opinion for PCT/US2018/053683 dated Feb. 15, 2019.
PCT International Search Report and Written Opinion for PCT/US2019/026939 dated Jul. 15, 2019.
PCT International Search Report and Written Opinion for PCT/US2019/040221 dated Aug. 30, 2019.
PCT International Search Report and Written Opinion for PCT/US2020/027614 dated Sep. 14, 2020.
PCT International Search Report and Written Opinion for PCT/US2020/027615 dated Jun. 25, 2020.
PCT Invitation to Pay Additional Fees, and, Where Applicable, Protest Fee, for PCT/US2020/027614 dated Jul. 24, 2020.
The Preferential Heating process for PET flat or asymmetric containers on SBO Universal and SBO Compact blow molders, www.sidel.com, publication date unknown.
All Office Actions, U.S. Appl. No. 17/226,203.
All Office Actions, U.S. Appl. No. 17/320,569.
CM04872M PCT Search Report and Written Opinion for PCT/US2018/055607 dated Feb. 15, 2019.
Unpublished U.S. Appl. No. 17/226,203, filed on Apr. 9, 2021, to Marc Andrew Mamak et al.
Fundamental Technology of Coating Material, published on Jun. 30, 2012, 12 pgs.

\* cited by examiner

BLOW MOLDED ARTICLE WITH VISUAL EFFECTS

FIELD OF THE INVENTION

The present invention relates to blow molded articles with effect pigments showing high gloss, low haze and high resistance to delamination. The invention relates also to preforms for making such articles and to methods for making these preforms and articles.

BACKGROUND OF THE INVENTION

Blow molded articles made of thermoplastic materials such as polyethylene terephthalate (PET) and obtained from stretch blow molding of an injected preform (injection stretch blow molded articles, also called ISBM articles) are popularly used in various industries, including the cosmetic, laundry, and food industries. In particular, containers for such fields and in particular bottles for liquid products are made in this way. For such articles, having a glossy and pearlescent and/or metallic appearance is particularly desirable as it is appealing to users and tends to connote a premium product.

In order to obtain such appearance so called "effect pigments" have been developed. The materials marketed as "effect pigments" are pigments that give additional color effects such as angular color dependence (iridescence, color travel, luster) or texture when applied in an application medium. These pigments are predominantly composed of particles having a platelet like shape which tend to orient in a direction parallel to the surface to which they are applied. The optical effects of these pigment (including luster, pearlescence, iridescence, metallic effect) arises from reflection of incident light from the smooth surface of the pigment platelets.

Effect pigments work well when applied onto a solid surface because their platelet like particles spontaneously orient in a direction parallel to the surface on which they are applied. However the introduction of effect pigments in large scale blow molding operations has been found to be more problematic and in fact effect pigments do not find a broad industrial application in this field, especially when considering containers for liquid products which need to be mass produced quickly and at a low cost.

Effect pigments can be applied on blow molded articles using standard coating application techniques such as painting or printing, however this adds complexity, costs and additional problems such as need for lacquering which are not realistic in the mass production of blow molded articles. One relevant issue in in the introduction of effect pigments within a blow molding manufacturing process is that the pigment particles remain dispersed within the wall of the article in a largely random orientation so that their effect is reduced.

An additional problem (partially connected to the poor orientation of the particles in a blow molded article) is that blow molded articles comprising effect pigments have been found to have poor gloss and high haze. Without being bound by theory it is believed this is due to the unevenness of the external surface of the articles when effect pigments are present possibly due to the random orientation of the platelet particles which in part will be exposed at the surface of the article in all orientations.

One possible solution to the problem of poor gloss can be to produce a preform and resultant container wherein an inner layer comprises a pearlescent agent and an outer layer is transparent and comprises a colorant. The preforms are generally manufactured with two-steps methods i.e. method where the materials making up the various layers are introduced in sequence. One suggested process can include co-molding/overmolding i.e. a process where the various layers are molded one over the other in subsequent steps and two step coinjection wherein the material of an outer layer is injected first into the mold cavity and is subsequently followed by the material of an inner layer. However, we have observed that in certain cases such construction method leads to poor mechanical properties of the finished article, so that the layers may separate during use (delamination).

Thus, there is still a need to find a better way to provide visual benefits to an article produced via blow molding while keeping the process simple, cost effective and scalable to mass manufacture and wherein the resulting article is resistant to delamination.

SUMMARY OF THE INVENTION

The present invention relates to a blow molded article having a hollow body defined by a wall wherein the wall has an inside surface and an outside surface, the wall being formed in at least one region by 3 layers, a layer A including the outside surface of the wall in that region, a layer B including the inside surface of the wall in that region and a layer C sandwiched between layers A and B, the three layers A, B and C together making up the entire wall of the article in that region, said article being obtained by blow molding of a preform made via parallel flow coinjection of 2 or more streams and wherein one or more streams make up layers A and B and the remaining streams make up layer C, wherein layer A is transparent and layer C comprises an effect pigment visible through layer A.

The present invention also relates to a preform which can be blow molded to obtain such an article and methods of making this article and preform.

BRIEF DESCRIPTION OF THE DRAWINGS

While the specification concludes with claims particularly pointing out and distinctly claiming the subject matter of the present invention, it is believed that the invention can be more readily understood from the following description taken in connection with the accompanying drawings, in which:

DETAILED DESCRIPTION OF THE INVENTION

Definitions

Figure 1A:
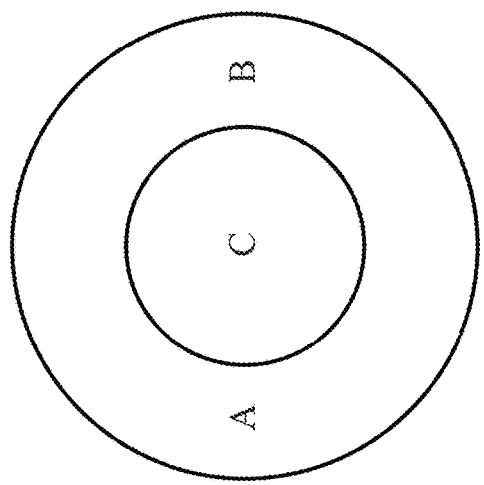
FIG. 1A is a schematic of an injector arrangement where the nozzles are concentric.

"Article", as used herein refers to an individual blow molded hollow object for consumer usage, e.g. a container suitable for containing compositions. The article can be a container, non-limiting examples of which include a bottle, a tottle, a jar, a cup, a cap, tube, and the like. In some examples, the container is a bottle. In the case of containers, the layer A can include the outside surface of the container and the layer B can include the inside surface of the container. The term "container" is used to broadly include elements of a container, such as a closure or dispenser of a container. The compositions contained in such a container may be any of a variety of compositions including, but not limited to, detergents (e.g., laundry detergent, fabric softener, dish care, skin and hair care), beverages, powders, paper (e.g., tissues, wipes), beauty care compositions (e.g., cosmetics, lotions), medicinal, oral care (e.g., tooth paste, mouth wash), and the like. The container may be used to store, transport, and/or dispense compositions contained therein. Non-limiting volumes containable within the container are from 10 ml, 100 ml, 500 ml or 1000 ml to 1500 ml, 2000 ml or 4000 ml.

"Blow molding" refers to a manufacturing process by which hollow cavity-containing plastic articles are formed and are generally suitable for containing compositions. The blow molding process typically begins with melting, or at least partially melting or heat-softening (plasticating) the thermoplastic material and forming it into a parison (when using Extrusion Blow Molding) or preform (when using injection blow molding or injection stretch blow molding), where said parison or preform can be formed by a molding or shaping step such as by extrusion through a die head or injection molding. The parison or preform is a tube-like piece of plastic with a hole in one end through which compressed gas can pass. The parison or perform is clamped into a mold and air is pumped into it, sometimes coupled with mechanical stretching of the parison or perform (known as "stretch blow-molding"). The parison or perform may be preheated before air is pumped into it. The pressure pushes the thermoplastic out to conform to the shape of the mold containing it. Once the plastic has cooled and stiffened, the mold is opened and the part ejected. In general, there are three main types of blow molding: extrusion blow molding (EBM), injection blow molding (IBM), and injection stretch blow molding (ISBM). The articles of the present invention are made via ISBM.

As used herein, the articles including "a" and "an" when used in a claim, are understood to mean one or more of what is claimed or described.

As used herein, the terms "comprise", "comprises", "comprising", "include", "includes", "including", "contain", "contains", and "containing" are meant to be non-limiting, i.e., other steps and other ingredients, which do not affect the end of result, can be added. The above terms encompass the terms "consisting of" and "consisting essentially of".

All percentages are weight percentages based on the weight of the composition, unless otherwise specified. All ratios are weight ratios, unless specifically stated otherwise. All numeric ranges are inclusive of narrower ranges; delineated upper and lower range limits are interchangeable to create further ranges not explicitly delineated. The number of significant digits conveys neither limitation on the indicated amounts nor on the accuracy of the measurements. All measurements are understood to be made at about 25° C. and at ambient conditions, where "ambient conditions" means conditions under about one atmosphere pressure and at about 50% relative humidity.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The present invention pertains to the field of blow molded articles having a hollow body, such as containers and bottles, made via a process of injection stretch blow molding (ISBM article).

The ISBM process starts with a first step where a thermoplastic material, typically a thermoplastic resin, is melted and then injected into a preform mold, so to form a preform. When the preform is then released from the preform mold, it can be immediately processed but more typically it is cooled, stored, and processed at a stretch blow molding station at a subsequent time and/or location. In a second step, the preform is introduced into a stretch blow molding equipment where the preform is blow molded to its final shape via heating and stretching, typically using a core rod. In the ISBM process, as opposed to other blow molding processes, the preform is reheated to a sufficiently high temperature to allow the preform to be inflated so that a biaxial molecular alignment in the sidewall of the resulting blow-molded container is achieved. With the preform held at the neck, air pressure, and usually, a stretch rod is used to stretch the preform in the axial direction, and optionally also in the radial direction. In the case of bottles, the neck portion of the article can contain threads or flanges suitable for a closure and are typically unchanged with respect to the preform as the neck part is often not stretched. The articles obtained by injection stretch blow-molding can be significantly longer than the preform. More information on injection stretch blow-molding processes can be obtained from general textbooks, for example "The Wiley Encyclopedia of Packaging Technology", Second Edition (1997), published by Wiley-Interscience Publication (see pages 87-89).

Many variations are possible to these steps as known to the skilled person. For example, in some common cases, the preform is stretch blow molded within the same machine where the preform is made, but the two steps/two machines process is far more common.

Articles made using ISBM process (as well as their respective preforms made via injection molding) can be distinguished from similar articles made using a different process e.g. extrusion blow molding, for the presence of a gate mark, i.e. a small raised dot which indicates the "gate" where the injection took place. Typically, in the case of container and bottles, the "gate mark" is present at the bottom of the article.

Articles and preforms according to the invention are typically made from thermoplastic materials, typically comprising thermoplastic resins.

An article of the present invention may comprise more than 50 wt %, alternatively more than 70 wt %, alternatively more than 80 wt %, alternatively more than 90 wt % of a thermoplastic resin, selected from the group consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), or a polyolefin, for example one of low-density polyethylene (LDPE), linear low-density polyethylene (LLPDE), high-density polyethylene (HDPE), polypropylene (PP), polymethylpentene (PMP), liquid crystalline polymer (LCP), cyclic olefin copolymer (COC), and combinations thereof. In some examples, the thermoplastic resin is selected from the group consisting of PET, HDPE, LDPE, PP, PVC, PETG, PEN, PS, and a combination thereof. In one example, the thermoplastic resin can be PET.

Recycled thermoplastic materials may also be used, e.g., post-consumer recycled polyethylene terephthalate (PCR-PET), post-industrial recycled polyethylene terephthalate (PIRPET), and/or regrind polyethylene terephthalate.

The thermoplastic materials described herein may be formed by using a combination of monomers derived from renewable sources and monomers derived from non-renewable (e.g., petroleum) sources. For example, the thermoplastic resin may comprise polymers made from bio-derived monomers in whole, or comprise polymers partly made from bio-derived monomers and partly made from petroleum-derived monomers.

The thermoplastic resin used herein could have relatively narrow weight distribution, e.g., metallocene PE polymerized by using metallocene catalysts. These materials can improve the gloss of the article. Metallocene thermoplastic materials can, however, be more expensive than commodity materials. Therefore, in an alternative embodiment, the article is substantially free of the expensive metallocene thermoplastic materials.

The blow molded articles of the present invention are multilayer articles in the sense that at least a region of the wall defining their hollow body comprises a layer A, including the outside surface of the wall in that region, a layer B including the inside surface of the wall in that region and a layer C sandwiched between layers A and B, wherein the three layers together make up the entire wall of the article in that region. The multilayer region (i.e. the region comprising layers A, B and C) can make up a major portion of the article wall surface, alternatively over 60%, alternatively over 80%, alternatively more than 90% so that its benefits can be extended over a larger portion of the article. In some case the multilayer region may extend to the entire article wall.

The thickness of the article wall in the region formed by three layers may be from 0.2 to 5 mm. The relative thickness of the three layers can vary. However, in some example layer C may have a thickness which can be between 5% and 40% of the total thickness of the article wall.

It was surprisingly found that reduction of the thickness of the C layer can be associated with improved opacity of the article and improved optical properties, even when the total thickness of the article wall is the same and the pigment content on the total article is not changed. Without being limited by the theory, it is perceived that narrower C layer contributes to effect pigment particles being more tightly packed with each other which results in a more parallel orientation of the largest surface of the pigment parallel to the outside surface. In addition, narrower C layer corresponds to higher laminal shear during the injection process toward the making of the preform, which also contributes to a more consistent orientation of the particle's largest surface parallel to the outside article surface.

The hollow article can comprise a layer with an effect pigment (e.g. a C-layer) that can comprise can comprise from about 10% to about 50% of the total wall thickness, alternatively from about 15% to about 45% of the total wall thickness, and alternatively from about 20% to about 40% of the total wall thickness.

The layer A can be transparent, and the layer C can comprises an effect pigment visible through the transparent layer A. The advantages in the article appearance are largely independent from the nature of layer B. However, layer B may be made from the same material of layer A and therefore be transparent as layer A. Layer B can also help improve the strength and resilience of the bottle.

"Effect pigments" are marketed as such by the major pigments suppliers such as Merck® or BASF®. Effect pigments can include "metal effect pigments" and "special effect pigments." Metal effect pigments can comprise metallic cores such as aluminum. They can create a metal-like luster by reflection of light at the surface of the metal platelets when they have parallel alignment in their application system. Metal effect pigments can include metal platelets coated with inorganic oxides such as silica, titanium dioxide, iron oxide, and other oxides. Special effect pigments include all other platelet-like effect pigments which cannot be classified as "metal effect pigments." These are typically based on a substrate which has platelet shaped crystals (or particles) such as mica, (natural or synthetic) borosilicate glass, alumina flakes, and/or silica flakes. These platelet shaped particles are typically coated with oxides. In some examples, the special effect pigments can be "pearlescent pigments" (also referred to as "pearl luster pigments"). Also suitable are "interference pigments". Interference pigments are defined as special effect pigments whose color is generated completely or predominantly by the phenomenon of interference of light.

The content of effect pigment can be a layer can be typically from 0.01% to 5%, by total weight of the layer.

In addition to or instead of effect pigments, the article wall can contain opacifying pigments.

Opacifying pigments can include opacifiers, opaque absorption pigments, and combinations thereof.

Non-limiting examples of opacifiers can include titanium dioxide, calcium carbonate, silica, mica, clays, minerals and combinations thereof. Opacifiers can be any domain/particle with suitably different refractive index from the Thermoplastic Materials (e.g. PET, which can include poly(methyl methacrylate), silicone, liquid crystalline polymer (LCP), polymethylpentene (PMP), air, gases, etc.). Additionally, opacifiers can have the appearance of being white due to scattering of light or black due to absorption of light as well as shades in between as long as they block the majority of light from being transmitted to the layer underneath. Non-limiting examples of black opacifying pigments include carbon black and organic black pigments such as Paliogen® Black L 0086 (BASF).

Opaque absorption pigments can include particles that provide color and opacity to the material in which they are present. Opaque absorption pigments can be inorgainic or organic particulate materials. All absorption pigments can be opaque if their average particle size is sufficiently large, typically larger than 100 nm, alternatively larger than 500 nm, alternatively larger than 1 micrometer, and alternatively larger than 5 micrometers. Absorption pigments can be organic pigments and/or inorganic pigments. Non-limiting examples of organic absorption pigments can include azo and diazo pigments such as azo and diazo lake, Hansas, benzimidazolones, diarylides, pyrazolones, yellows and reds; polycyclic pigments such as phthalocyanines, quinacridones, perylenes, perinones, dioxazines, anthraquinones, isoindolins, thioindigo, diaryl or quinophthalone pigment, Aniline Black, and combinations thereof. Non-limiting examples of inorganic pigments can include titanium yellow, iron oxide, ultramarine blue, cobalt blue, chromic oxide green, Lead Yellow, cadmium yellow and cadmium red, carbon black pigments, and combinations thereof. The organic and inorganic pigments can be used singly or in combination.

The term "layer" in the context of the present invention, referred to the layer A, B and C includes the possibility that each of the layers A, B and C are uniform or that they are made of two or more sub-layers. In case the A layer is made of two or more sub-layers the entire layer A may be transparent as required by the invention. In case the layer C is made of two or more layers (e.g. $C_1$ and $C_2$) it may be sufficient that the sublayer facing and being in direct contact with layer A comprises effect pigments as required in order to satisfy the feature that layer C comprises an effect pigment that is visible through layer A. Additional sublayers of layer B or C may include for example gas barrier layers. The thickness of the layer can be measured by the Layer Thickness Test Method, described hereafter.

A layer is considered as "transparent" in the context of the invention if that layer has total luminous transmittance of 50% or more and reflected haze of less than 5 haze units. The total luminous transmittance is measured in accordance with ASTM D1003, and the reflected haze is measured in accordance with ASTM E430.

Multilayer articles according to the invention are obtained by blow molding of a co-injected preform, wherein the preform may be obtained via parallel flow co-injection.

While a large part of the disclosure will be referred to the construction of the preform, it will be understood by the skilled person that any given structure, composition or sequence of layers in the preform will be reproduced in the finished blow molded article. During the stretch blow molding operation the preform can be stretched and thinned in all directions to form the finished article. While the stretching may not be the same in all points so that the finished article may not have the same thickness all over its surface, the sequence and composition of the layers making up the wall of the preform and of the article will not be significantly altered.

Co-injection molding is a technology widely used in the production of preforms. Its more common application is used to produce gas barrier bottles where a barrier layer is sandwiched between two plastic layers. Suppliers like Milacron®, Husky® and others offer co-injection molding equipment which can be used to manufacture multilayer preforms for the articles of the present invention. During co-injection the process can be controlled so that one layer forms the outside surface of the preform (and then the outside surface of the article after the stretch blow molding step), while one or more layer can be superimposed to the first layer toward the inner portion of the preform. These additional layers can be controlled so that they may extend over the entire article surface or only in portions of it. For example, in the case of a plastic bottle the second and optionally subsequent layers may extend only along the body of the bottle and be absent in the neck and/or the bottom of the bottle. Alternatively, in one example, one stream of material can be split prior to being injected into the mold so that it can form at the same time the inner and outer layers of the preform (layers A and B) and one or more additional streams may form additional layers between the inner and outer layer.

Co-injected preforms can be obtained with two different methods, "step flow co-injection" and "parallel flow co-injection". In the step flow co-injection method (such as the method described in the cited patent application WO2014/022990), the thermoplastic resins intended to form the different layers of the preform are injected one after another. A similar process exists which is the so-called "overmolding" wherein one layer is molded on top or within a layer molded previously. On the contrary, in the parallel flow co-injection method the thermoplastic resins intended to form the different layers of the preform are injected essentially at the same time. For the purpose of the present invention, a co-injection method is intended to be "parallel flow" if the injection of all streams of thermoplastic material forming the preform starts within 5 seconds from each other.

In the present invention, the preform for the blow molded articles can be made using a parallel flow co-injection process. The applicant has surprisingly observed that containers obtained by blow molding a preform made parallel flow co-injection have both improved gloss, low haze and improved resistance to delamination with respect to containers made via a step flow co-injection process.

The article can have a location on the outer surface with a gloss 20° of greater than or equal to 30 GUs, greater than or equal to 40 GUs, greater than or equal to 50 GUs, greater than or equal to 60 GUs, greater than or equal to 70 GUs, and/or greater than or equal to 75 GUs. The glossy region can have a location with a gloss 20° of from about 30 to about 120 GUs, from about 65 GUs to about 115 GUs, from about 70 to about 110 GUs, from about 90 GUs to about 110 GUs. The gloss 20° can be determined by the Gloss Test Method, described hereafter.

The article can have a location on the outer surface with a surface roughness of $\leq 1$ μm, alternatively $\leq 0.5\mu$, alternatively $\leq 0.25$ μm, and alternatively $\leq 0.1$ μm. The surface roughness can be determined with the Root Mean Square Roughness Test Method, described hereafter.

The article can have a location on the outer surface with a haze of $\leq 30$, alternatively $\leq 20$, alternatively $\leq 15$, alternatively ≤10, alternatively ≤5, alternatively ≤3, and alternatively ≤2. The article can have a location on the outer surface with a haze of from about 0 to about 30, alternatively about 0 to about 20, alternatively about 0.5 to about 15, alternatively about 0.8 to about 10, and alternatively about 1 to about 5. The haze can be determined by the Haze and Reflection Method, described hereafter.

The article can have a location on the outer surface with a haze anisotropy of <1, alternatively ≤0.9, alternatively ≤0.8, alternatively ≤0.7, and alternatively ≤0.6. The haze can be determined by the Haze and Reflection Method, described hereafter.

As mentioned above in a parallel flow co-injection equipment the thermoplastic materials making up the preform are injected into a preform mold using injector nozzles, with each nozzle delivering one stream of thermoplastic material. For the present invention, the streams can all be initiated in parallel flow as defined herein.

Figure 1B:
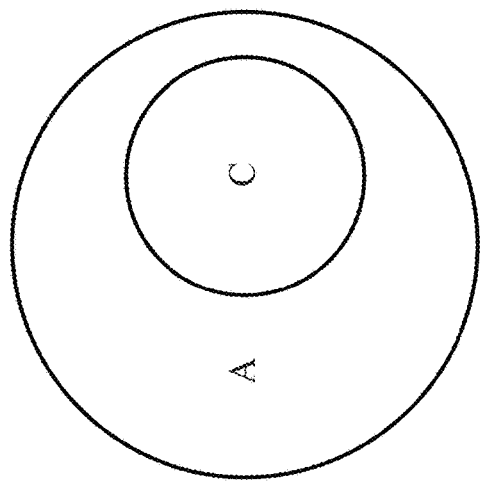
FIG. 1B is a schematic cross-section of an injector arrangement that are off-centered.
Figure 1C:
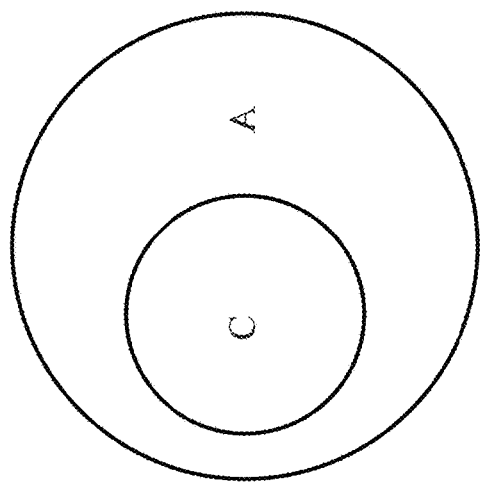
FIG. 1C is a schematic cross-section of an injector arrangement that are off-centered.

The injectors can be arranged in a number of different ways including the arrangements shown in FIGS. 1A-C. The injector nozzle arrangement can allow preforms to be manufactured with different characteristics and different layouts of the multilayer region. For example, an injector arrangement useful in making preforms for the present invention is concentric nozzles, e.g. one where a nozzle delivering the thermoplastic material for layer C (stream I) is disposed within a larger nozzle delivering the thermoplastic material for layers A and B (stream II) (see FIG. 1A). In this design the thermoplastic material for layers A and B is typically the same so that one single resin flows within one nozzle and the material for layer C forms a layer sandwiched between two layers of the A/B material.

The injector nozzle arrangement of FIG. 1A can result in two concentric streams of the melted thermoplastic components that result from the concentric nozzles C and A/B. The outer nozzle A/B can dispense stream II, which can include a thermoplastic composition that eventually forms the transparent outside layer A of the article and the inside layer B, as shown in enlarged schematic cross-section in FIG. 2. The inner nozzle C, corresponds to stream I, which can include a melted combination of thermoplastic resin and effect pigment that eventually forms the pigmented layer C of the article, as shown in the enlarged schematic cross-section in FIG. 2.

Different nozzle arrangements can result in different flow patterns of streams I and II. FIGS. 1B and 1C shows an injector nozzles A and C that are off-centered (non-concentric or biased). The outer nozzle C can dispense stream II and the inner nozzle C can dispense stream I. In FIG. 1B, the placement of the injector nozzle A and C can enable a thicker A layer, which comprises the outer surface of the article. In FIG. 1C, the placement of the injector nozzle A and C can enable a thinner A layer and a thicker B layer, which comprises the inner surface of the article. To obtain this stream pattern, several methods can be utilized. Processes with non-concentric nozzles require the center nozzle to be positioned off-center, while processes with valve pin plates would adjust the profile creating the offset preferential flow. The biased position in FIG. 1B can allow for more A material to flow to the outside of the preform, which can result in improved visual effects of the article.

Table 1, below, includes example containers with the container wall thickness and the thickness of each layer and % total of each layer.

TABLE 1

| | A (μm) | C (μm) | B (μm) | Total (μm) | A % | B % | C % | A:C |
|---|---|---|---|---|---|---|---|---|
| Symmetric Example | 120 | 160 | 120 | 400 | 30 | 40 | 30 | 0.75 |
| Biased Example | 250 | 370 | 157 | 777 | 32 | 48 | 20 | 0.68 |
| Ex. 1* | 170 | 160 | 70 | 400 | 43 | 40 | 17 | 1.06 |
| Ex. 2* | 145 | 60 | 95 | 300 | 48 | 20 | 32 | 2.42 |

*Additional details regarding Ex. 1 and 2 are in Table 4, hereafter.

In examples where the nozzle is not off-center, there can be approximately equal amounts (for instance within about 10% of each other) of material in the layer forming the outer surface (A layer) and the layer forming the inner surface (B layer). However, when the nozzle is biased, as depicted in FIG. 1B, the layer forming the outer surface (A layer) can be larger than the layer forming the inner surface (B layer), for instance the A layer can be at least 20% larger than the B layer, alternatively at least 30% larger, alternatively at least 40% larger, alternatively at least 50% larger, alternatively at least 70% larger, and alternatively at least 80% larger.

Regardless of nozzle placement, the hollow article can comprise a layer forming the outer surface (A layer) that can comprise can comprise from about 30% to about 70% of the total wall thickness, alternatively from about 35% to about 65% of the total wall thickness, and alternatively from about 40% to about 60% of the total wall thickness.

Positioning of stream I is selected by considering the desired properties of the final article. Processes utilizing concentric streams, similar to the nozzle arrangement in FIG. 1A, can yield an article with increased gloss and appearance of depth versus articles made by a single injector that yields a monolayer article. Some layer configures in the wall can also improve barrier properties.

FIG. 1B shows a nozzle arrangement where stream I is biased to the inside, which can yield an article with a further increased appearance of depth and chroma as compared to articles made with utilizing concentric streams, similar to the nozzle arrangement in FIG. 1A. The improved chroma can be apparent from normal viewing by the observer (i.e. article surface is perpendicular to the viewer). However, angle dependent effects can also be enhanced by modifying the position of stream I (and increasing the thickness of the outermost transparent layer). Specifically, one can observe a larger color flop effect when the surface of the object is viewed at oblique/specular angles versus normal angles due to the path length of light through the outer A-layer.

Additionally, stream II can contains a transparent colorant or toner, the color strength or chroma can be increased as compared to a process represented that creates an A layer and a B layer with approximately equal thickness, like the article produced in FIG. 1A. Likewise, if the observer position remains constant, angle dependent effects can be observed due to the curvature of the article at different regions of the article. This is true because different regions can have different appearance such as chroma, degree of lightness, etc., even though these regions all contain the identical pigment/particle loading. Additionally, by increasing the thickness of the A layer, one may be able to decrease the amount of colorant/toner required to achieve a desired appearance.

FIG. 1C, shows a nozzle arrangement where stream I is biased to the outside, resulting in a narrower A layer, which can yields an article with decreased gloss and less depth effect while increasing the matte like finish as compared to processes utilizing concentric streams, similar to the nozzle arrangement in FIG. 1A. The surface may also have an increased surface roughness because of the presence of pigment particles near the outermost surface of the article.

Figure 1D:
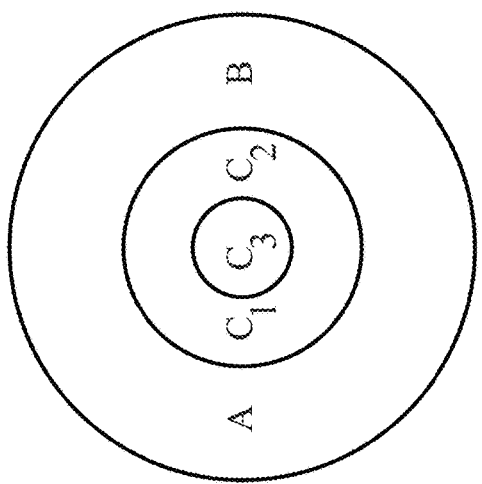
FIG. 1D is a schematic cross-section of an injector arrangement for making preforms with two concentric injection nozzles.
Figure 1E:
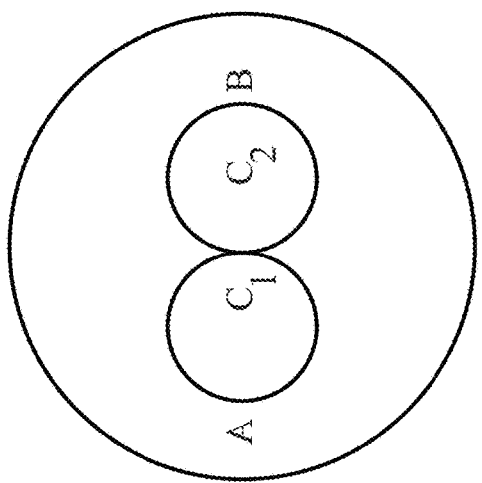
FIG. 1E is a schematic cross-section of an injector arrangement for making preforms with two parallel injection nozzles.
Figure 1F:
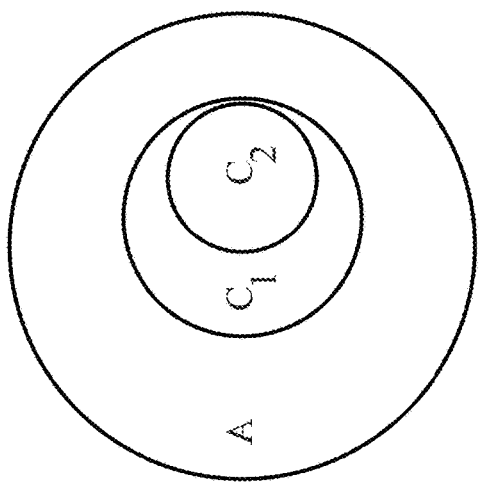
FIG. 1F is a schematic cross-section of an injector arrangement for making preforms with two off-centered injection nozzles.

Alternatively, when layer C is formed by two or more sublayers, the thermoplastic material making up these sub layers can be delivered by a number of nozzles which are in turn concentric (see FIG. 1D) or parallel (see FIG. 1E) or biased (see FIG. 1F). These different arrangements allow to introduce additional functional sub-layers in C, such as for example a gas barrier layer through the nozzle $C_1/C_2$ in FIG. 1D or nozzle $C_1$ and/or $C_2$ in FIGS. 1E and 1F. In one example, the functional sub-layer may be free of or substantially free of pigments/colorants.

In another example, the functional sub-layer, in particular the layer formed by the stream from nozzle $C_2$ in a configuration like FIGS. 1E and 1F or $C_3$ in a nozzle configuration like FIG. 1D, can include a dark colored and/or black colorant and/or a pigment. In this example the layer formed by the stream from nozzle $C_1$ (in a nozzle configuration like FIGS. 1E and 1F) or $C_1/C_2$ (in a nozzle configuration like FIG. 1D) can include the effect pigment. This can place the black/dark colorant or pigment closer to the hollow body of the article, allowing for absorption of transmitted light, and thereby enhancing the reflected light portion. Many effect pigments are engineered to reflect a portion of visible light by the interference of light rays while the unreflected portion is transmitted through the effect pigment platelet. The transmitted light often undergoes multiple scattering events before it is reflected back to the observer. This transmitted, scattered and reflected light mixes with the interference color to make a less chromatic, less lustrous color effect. By positioning a black layer behind the effect pigment layer, this mixing is eliminated thereby allowing the observer to see chromatic and lustrous colors produced by the interference reflection.

Figure 2:
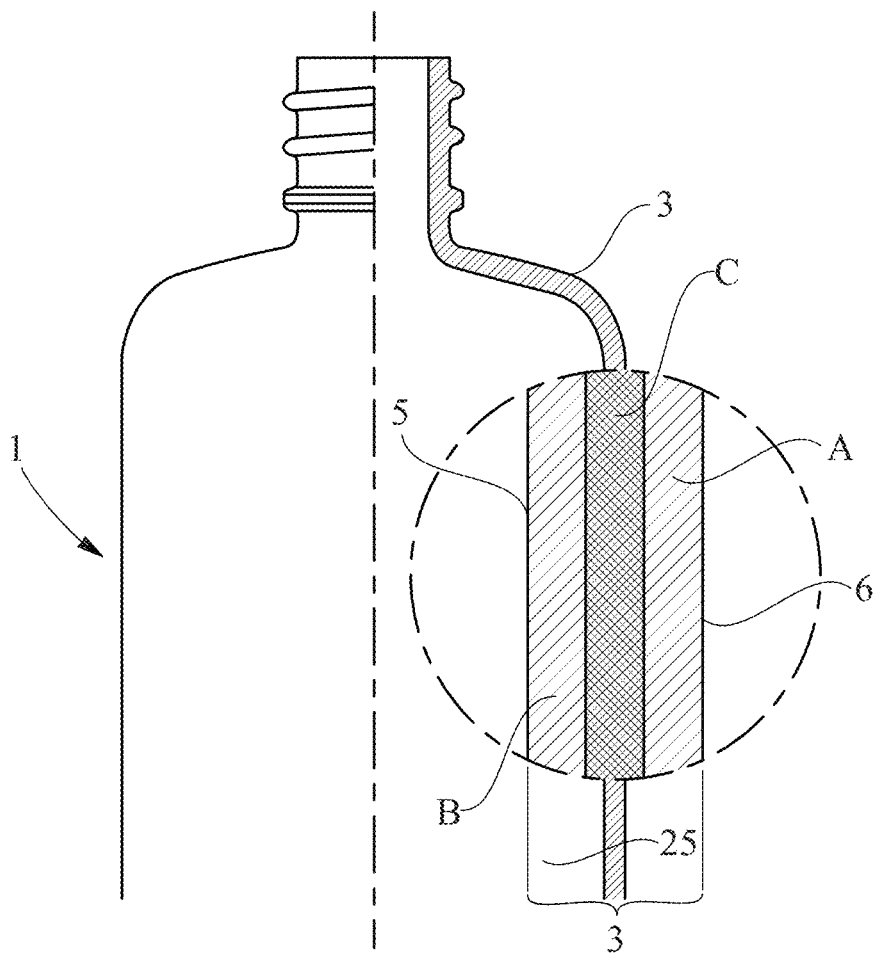
FIG. 2 represents schematically a bottle according to the showing an enlarged schematic cross-section thereof with layers A, B and C.

FIG. 2 shows hollow article 1, in this example the hollow article is a container, specifically a bottle. The hollow article 1 includes hollow body 25 defined by wall 3 having an inner surface 5 and an outer surface 6. The enlarged cross-section of the article wall 3 has three layers. The wall can be formed without adhesives (or substantially free of adhesives) by ISBM. Layer C can comprise the effect pigments that can be visible through the transparent layer A (A) from outside of the hollow article. Layer A (A) can be colored or colorless. Layer B (B) can be the same material as layer A (A).

It has been found that, during the production of preforms for the present invention, a tight control of the temperatures is beneficial to the regularity of the layers. Temperature can have a significant impact on the viscosity of the thermoplastic material. In one example, the material for layer C (stream I) can be injected at a lower temperature than the material for layers A and B (stream II). In another example where the resin for layers A, B, and C can contain PET, the material for layer C (stream I) can be injected at a similar temperature to the material for layers A and B (stream II). The temperature range for the material of layers A and B (stream II) can be between about 290 and about 305° C., and alternatively from about 240° C. to about 305° C., as measured at the point of injection. In one example, the temperature for the material of layers A and B (stream II) can be about 280° C., as measured at the point of injection. The material for layer C (stream I) can be at a temperature in a range from about 260° ° C. to about 310° C., and alternatively from about 260° C. and about 275° C., as measured at the point of injection. In one example, the temperature for the material of layer C (stream I) can be greater than or equal to 280° C., as measured at the point of injection. This lower temperature and higher viscosity contribute to a better and more uniform formation of the layers. The difference between the viscosity of stream I and stream II may be monitored well and adjusted to prevent malformed layers or anomalies in the flow. In some examples, instabilities can be desirable to create unique patterns on the surface of the bottle.

Another process parameter that can be controlled during the co-injection of the preforms is pressure of the streams of resin measure along the manifold line supplying the injection nozzle. The stream (or streams) containing the material for layers A and B (stream II) can be kept in a range between about 25 bar and about 400 bar, and alternatively between about 150 and about 400 bar, while the lower temperature/ higher viscosity stream of layer C (stream I) can be kept in a range between about 1000 and about 1600 bars, alternatively between about 1000 and 1400 bars.

Figure 3:
FIG. 3 is a photograph of a multilayer bottle with effect pigments under a transparent layer.

In order to preserve transparency of the outside layer, it is beneficial to quickly cool down the preform as soon as it is formed and also quickly cool the article after the stretch blow molding operation is performed. This is because a prolonged exposure at temperatures close to the glass transition temperature (Tg) of the resin can promote crystallization of the resin, which in turn can be detrimental to transparency. Quick cooling allows the preservation of as much as possible of an amorphous structure which has higher transparency FIG. 3 is a photograph of a bottle with a wall comprising multiple layers, for instance the A-C-B configuration described herein. The A-layer is transparent and colored, and the C layer comprises the effect pigment. This combination of layers can give the bottle in FIG. 3 a very glossy, metallic, sparkly, and/or shimmery appearance. FIG. 3 has a front side that is non-planar and has a swoosh apex that is highly reflective on one side and far less reflective on another, creating an eye-catching shadow on the front surface of the bottle.

In the article of the present invention the layer C, comprising the effect pigments, can be visible through the layer A from outside of the hollow article. The layer A can be colored or colorless. Layer A can be transparent. Layer A can be essentially free or free of pigments and/or of particles said pigments or particles having their largest dimension between 150 nm and 5000 nm (wherein essentially free means that layer A can contains less than 1 wt % of pigments or particles having their largest dimension between 150 nm and 5000 nm). Layer A if desired can be colored using a soluble dye or a transparent pigment in the thermoplastic material which makes up the layer in order to obtain more aesthetically pleasing effects. Pigments become transparent in a matrix when the difference between the refractive index of the pigment (which depends on wavelength) and that of the matrix is small, and when the particle size of the pigment is below that which Mie scattering occurs (typically a largest particle dimension of about 100 nm or less).

The presence of a smooth transparent outermost layer of the container allows layer C, which comprises the effect pigments, to be visible from outside and, at the same time provides the bottle with a high level of gloss. Without being bound by theory it is also believed that the presence of a glossy surface at a distance from the opaque surface of layer C, which comprises the effect pigments, can contribute to a premium appearance of the article itself. This may be the case because of the existence of two slightly shifted focal points, which provide the viewer with an effect of impression of depth.

We mentioned earlier the problem of the orientation of effect pigments particles, which can have a platelet like particle shape when the article wall is formed via an ISBM process. It has been surprisingly found that, in articles according to the invention, the effect pigment particles in layer C are predominantly oriented so that their face is parallel to the surface of the article to a higher degree than for monolayer articles. Without being bound by theory we believe this may be due to a combination of factors. A potential contributing factor may be the fact that in monolayer articles the effect pigments are dispersed in the entire wall of the article which is thicker (at parity mechanical strength of the article) than the C layer sandwiched between layers A and B as in articles according to the invention. In monolayer articles the particles have more free space to freely rotate while. On the contrary, in the case of a multilayer article according to the invention, the layer C, where the effect pigments are confined, is much thinner as it only represents a portion of the total thickness of the article. As a result, the stretching steps can contribute to optimum orientation of a larger percentage of platelet-like pigment particles.

It has further been found that the tendency for the platelet effect pigments to orient parallel to the surface of the article persists even when the article is irregularly shaped. As such, the shape of the article can be further used to modify the visual effects generated by the article from the point of view of a person viewing the article, depending on the orientation of the article when being viewed. For example, an article that is predominantly cylindrical should have visual effects conferred by the effect pigments that are relatively constant to the viewer, regardless of the orientation of the article relative to its primary axis. When the article is predominantly cylindrical, it can be rotated about its primary axis without substantially modifying the visual effects, because the article is radially symmetric about the primary axis, and the orientations of the effect pigments will be largely unchanged relative to the point-of-view of the viewer. Further, in a substantially cylindrical bottle, the effect pigment platelets are expected to be oriented substantially perpendicular to the viewer's line-of-sight near the center of the article, and increasingly angled away from the viewer towards the edges of the article as viewed by the viewer. As such, any optical effects that may rely on reflectance of incident light by the effect pigments would be directed towards the viewer near the center of the article but directed away from the viewer at the edges of the article.

For example, visual effects such as gloss, reflectance, and the like may be more pronounced towards the center of the article as viewed, which may then interfere with other decoration and/or labelling of the article, which could be incorporated near the center of the article.

Alternately, where the article is substantially non-cylindrical, and heightened visual effects derived from an orientation of the platelet effect pigments, especially when combined with a layer A having transparent color, may be made to occur anywhere on the article by incorporating concave and convex contours into the overall bottle shape. Such contours can help provide optical effects that occur at one or more particular viewing angle(s) and/or one or more illumination angle(s).

Without being bound by theory, it is believed that the ray path of incident light into the article and returning to the observer can be affected by the article curvature such that the surface of the articles will receive glancing angles where the light ray will interact mainly with Layer A having transparent color, versus normal angles whereby the light ray will interact with both Layer A and Layer C at optimal orientation of effect pigment platelets. As such an article of the present invention, further comprising convex and concave portions, will create at least 3 distinct appearance regions visible to the observer without requiring rotation of the article and without requiring that the viewer change his/her point-of-view. These can be characterized as (a) a high chroma region, which may be due to the ray path confined to the Layer A; (b) a high lightness region, which may be due to optimal reflection off the effect pigment platelets; and (c) a region having a combination of these optical responses (which would be more typical for cylindrical articles).

It has also been found that the present invention yields a relatively high chroma at a viewing angle of −15° when illuminated at 45° from the surface normal. The −15° angle is important as it is generally the viewing-angle of highest reflectance. Hence it may be preferred that the article be viewed from this point-of-view. Rather than require the article be viewed from a specific angle, the preferred optical effect can be achieved by including a multiplicity of viewing angles through the incorporation of convex and concave features in the overall shape of the article.

Table 2, below, compares the chroma (C*), lightness (L*), hue (h°), and the change in chroma between the two viewing angles (ΔC*) of Example 3 with Comparative Examples 7 and 8. C*, L*, and h° can be determined by the chroma, Lightness and Hue test method described hereafter. As described in Table 4, hereafter, Example 3 has three PET layers and the middle layer contains 4% white pearl satin masterbatch. As described in Table 6, hereafter, Comparative Examples 7 and 8 have a single PET layer comprising 4% and 6% white pearl satin masterbatch, respectively.

TABLE 2

|  | Ex. 3 | Ex. 7. | Ex. 8 |
| --- | --- | --- | --- |
| C* (45 as-15) | 61.7 | 34.3 | 36.2 |
| L* (45 a s-15) | 123.6 | 127.7 | 128.7 |
| h°(45 as-15) | 137.3 | 133.3 | 131.6 |
| C* (45 as 45) | 31.7 | 25.5 | 35.9 |
| L*(45 as 45) | 50.1 | 41.2 | 35.9 |
| h°(45 as 45) | 144.7 | 139.0 | 135.2 |
| ΔC* | 30 | 8.8 | 0.3 |

The change in change in chroma for Example 3 was significantly larger than the change in chroma for Comparative Examples 7 and 8, even though all three examples contain at least 4% white pearl satin masterbatch. The angle dependence chroma effect, demonstrated by the high ΔC*, of Example 3 can be readily visible to consumers when they view the product, in particular, it can be eye catching at the store shelf. Angle dependent chroma can have the effect of the article appearing to have different color(s) as an observer passes-by the article or as the article passes-by the consumer. Obtaining high C* at geometries where the effect pigment provides maximum or near maximum L* is generally not achievable with single layer designs.

The hollow article can have a C* (45 as −15) that is greater than 35, alternatively greater than 40, alternatively greater than 45, alternatively greater than 50, alternatively greater than 55, and alternatively greater than 60. The hollow article can have ΔC* (absolute value of the difference between C* (45 as −15) and C* (45 as 45)) can be at least 9, alternatively at least 10, alternatively at least 13, alternatively at least 15, alternatively at least 20, alternatively at least 24, alternatively at least 27, and alternatively at least 29.

In one aspect, the center of the article, as seen by the viewer, may be relatively flat, and free from such convex and concave features, to allow for a product label and/or other branding or product identification without interference, while the portions of the article that are disposed towards the periphery of the article as seen by the viewer may comprise more substantial contours such as ridges, valleys and the like.

Such relatively flat portions as well as such valleys and ridges can be characterized by the radius of curvature of the surface of the article taken in cross-section. Said cross-section may be taken perpendicular to the primary axis of the article, or perpendicular relative to an axis perpendicular to the primary axis. Specifically, a relatively flat portion will have a relatively high radius of curvature and the peak of a ridge will have a relatively low radius of curvature. "Relatively high" and "relatively low" radii-of-curvature are taken to mean relative to the radius of curvature of a circle of equal perimeter to the cross-section of the article under consideration.

Where the contour is convex to the viewer (e.g. the curved portion protrudes out towards the viewer), the center of curvature would be away from the viewer versus the article surface, and where the contour is concave to the viewer (e.g. the curved portion protrudes away from the viewer) the center of curvature would be towards the viewer versus the article surface. By convention, the convex contour may be taken to have a positive radius of curvature, and the concave contour may be taken to have a negative radius of curvature.

A cylindrical article would have a constant radius of curvature when taken at the cross-section perpendicular to the primary axis. An un-curved or flat portion of the article would have an undefined radius of curvature. In some examples, the article is non-cylindrical.

An additional advantage of the hollow containers of the invention is that these containers have been surprisingly found to be more resistant to delamination. Delamination is a constant problem in the manufacturing blow molded multilayer hollow articles such as containers. Delamination can occur over time due to the mechanical handling of the container, to thermal stress or mechanical stress. In other examples, delamination can occur at the interface between the layers, causing the layers to separate, which can ultimately cause bubbles and/or rippling to appear underneath the outer surface. Without being bound by theory, we believe that the parallel flow coinjection used herein results in prolonged contact of the materials of the various layers still in melted or partially melted state. This ultimately leads to the formation of a transition region between the layers wherein the layers are slightly interpenetrated. This transition region generates a strong connection between the layers and thus makes it much more difficult to separate them, even without any adhesive at the interface.

Surprisingly it has also been found that multilayer articles according to the invention have an improved resistance to delamination not only with respect to articles obtained by blow molding of preforms made using step flow coinjection or 2-step overmolding, but even with respect to articles obtained from monolayer preforms.

In sequential injection molding processes (otherwise known as 2-step overmolding or co-molding), there is minimal mixing between the resins injected at each injection step since the first resin is essentially cooled/solidified before the second resin is injected. Thus, there is little to no flow/mixing and the material is more quiescent. Crystallization of one or both resins can also impact the bond strength. Slower cooling often results in some degree of crystallization, which is not desirable for making hollow articles with ISBM when the preform is heated and stretched. The optimization of bond strength while minimizing crystallization can be difficult to achieve using sequential injection molding since the mold is often kept at elevated temperature for longer amounts of time (hotter & longer than single shot injection mold) and the poor thermal conductivity at the interface of the first injected resin results in slower cooling of the second injected resin at/near the interface.

Parallel flow coinjection relies on at least two molten streams of resin each having a velocity greater than 0 during at least part of the mold filling process. Laminar and turbulent flow regimes have been described for parallel coinjection processes, where the laminar regime provides essentially no mixing between the streams and the turbulent regime provides excessive mixing where domains from one resin stream become mixed within the stream of the second resin. The laminar regime can provide poor strength at the interface. The turbulent region can also be undesirable, since this can create cloudiness (due to light scattering across regions of different refractive index). Also, turbulent mixing decreases the alignment/orientation of pigment particles within the turbulent zone, thereby decreasing the desirable optical effect from several classes of pigments including effect pigments.

While not willing to be bound by theory, the parallel coinjection process can have a flow regime in the transitional zone, which can allow for substantial mixing of parallelly injected resins without resulting in any cloudiness. Notwithstanding, polymer resins may have some miscibility at the melt temperature, so that when rapidly cooled by the injection molding process, different resins will remain mixed at the molecular level in the preform and the article.

Table 3, below, compares the average onset load of Examples A-G. Example A is a comparative example and was made by a two-step overmolding. Examples B-G were made by ISBM. Examples A-G all have a wall with three layers: layer A comprising the outer surface of the bottle; layer B comprising the inner surface of the bottle, and layer C located between layers A and B.

TABLE 3

| Ex. | Bottles Wall | Critical Normal Load (N) | Standard Deviation | Type of Failure | A/C and B/C Interface Thickness (Method A)) | A/C and B/C Interface Thickness (Method B) |
|---|---|---|---|---|---|---|
| A | PET/ PET/ PET | 12.5 | 1.39 | A | | |
| B | PET/ Nylon/ PET | 18.5 | 2.63 | A | <100 nm | |
| C | PET/ COC/ PET | 21.2 | 3.63 | PC | | |
| D | PET/ PEN/ PET | 30.1 | 5.24 | PC | | 2-4 μm |
| E | PET/ PET-G/ PET | 59.4 | 5.71 | C | | |
| F | PET/ LCP/ PET | 85.9 | 2.93 | C | | 5 μm |
| G | PET/ PET/ PET | 94.8 | 5.33 | C | ≥15 μm | 40-50 μm |

The Method for Critical Normal Load, was used to determine the critical normal for each example. The type of failure at the critical normal load was determined by visual inspection and categorized as adhesive failure (A), cohesive failure (C), or partial cohesive failure (PC).

In all parallel co-injection cases, the average onset load is higher versus the PET/PET/PET 2-step sample, even with substantially different resins used in the B layer (nylon, COC (cyclic olefin copolymer), PEN (polyethylene naphthalate), LCP (liquid crystalline polymer), and PET-G (post-consumer recycled plastic)).

In other words, the transition layer (tie layer) appears to further strengthen the article wall with respect to a monolayer execution. Delamination resistance is evaluated measuring the Critical Normal Load in the three layers region using the method described below in the test methods section. A higher Critical Normal Load indicates a higher delamination resistance. Articles according to the invention may have a Critical Normal Load of more than 50 N. The Critical Normal Load can be 70-120N.

The average onset load of the article can be greater than 30 N, greater than 40 N, greater than 50 N, greater than 55 N, greater than 60 N, greater than 65 N, greater than 70 N, greater than 80 N, greater than 85 N, and/or greater than 90 N, as determined by the Method for Critical Normal Load, described hereafter. The average onset load of the article can be from about 35 N to about 150 N, alternatively from about 30 to about 125 N, alternatively from about 50 N to about 100 N, and alternatively from about 55 N to about 95 N, as determined by the Method for Critical Normal Load, described hereafter.

The thickness of the A/C interface (also referred to as the tie layer) was determined by the Tie Layer Thickness Method, described hereafter. The thickness of the A/C interface is the distance normal to the interface over which the composition of the unique element is changing between the maximum concentration and minimum concentration.

The thickness of A/C or B/C (i.e. the tie layer or transition layer) can be from about 500 nm to about 125 μm, alternatively 1 μm to about 100 μm, alternatively from about 3 μm to about 75 μm, alternatively from about 6 μm to about 60 μm, alternatively from about 10 μm to about 50 μm, as determined by the Tie Layer Thickness Method, described hereafter.

Since there are no unique elements in the parallel coinjection PET/PET/PET sample (Example G), 6% titanium dioxide ($TiO_2$) masterbatch was added to the stream forming layers A and B and 6% masterbatch containing black pigment comprising chlorine (Cl) was added to the stream forming layer C. This was used to generate the images in FIGS. 4-D. This method (A method) was used to determine that Example G had an interface thickness of >15 μm.

Figure 4A:
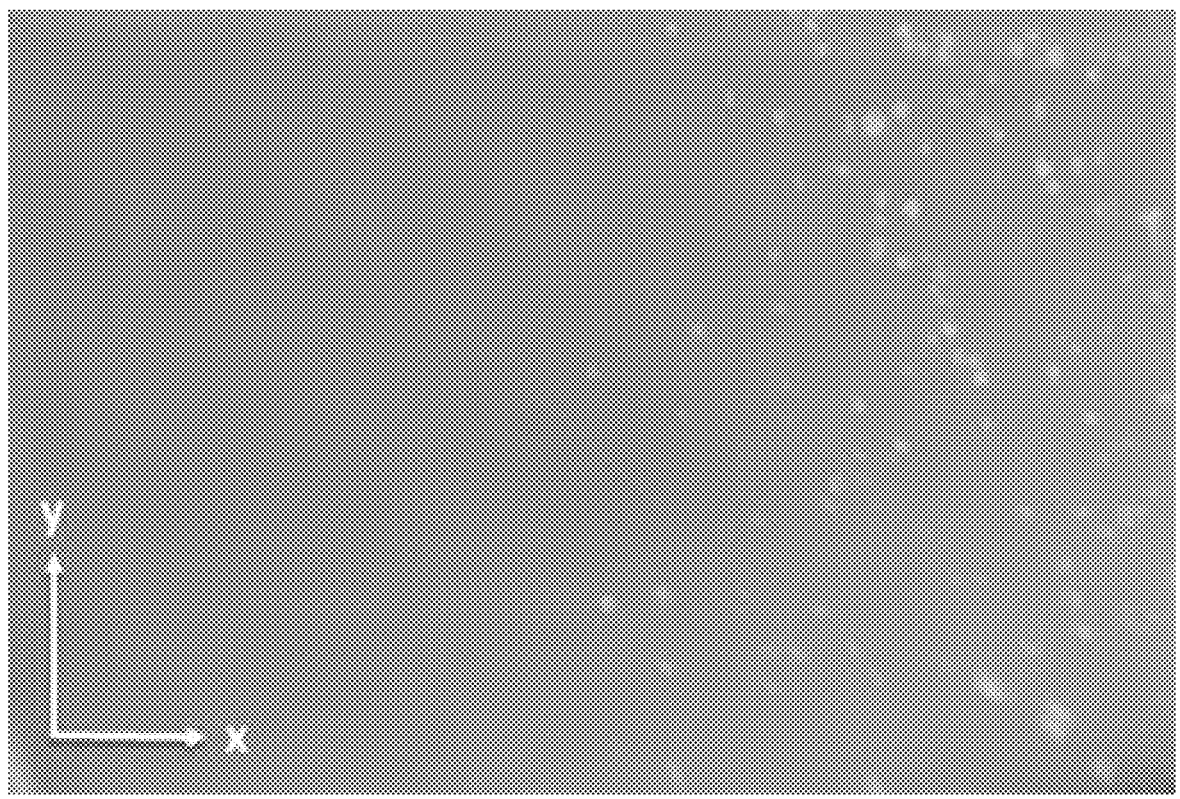
FIG. 4A FIG. 4A is a high angle annular dark field (HAADF) STEM image at the A/C interface (tie layer) of Example G.
Figure 4B:
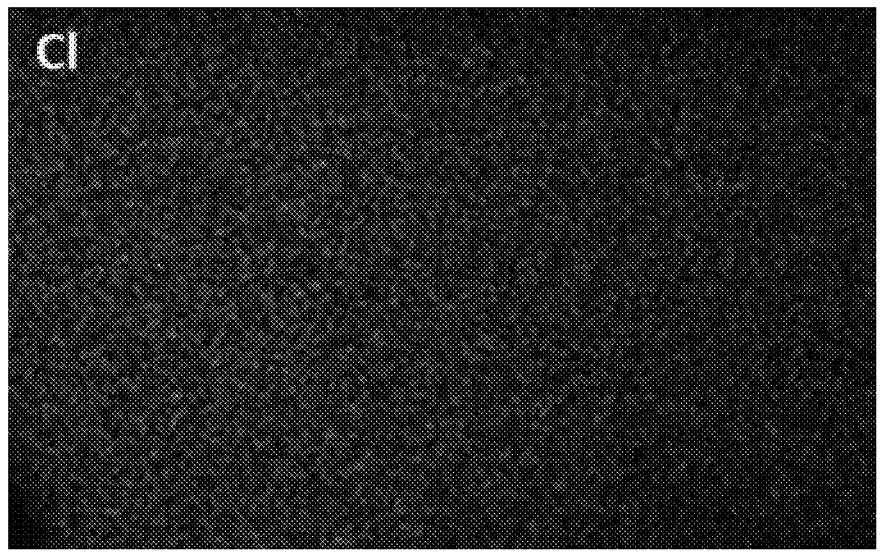
FIG. 4B is an elemental map across the region for Cl of Example G.
Figure 4C:
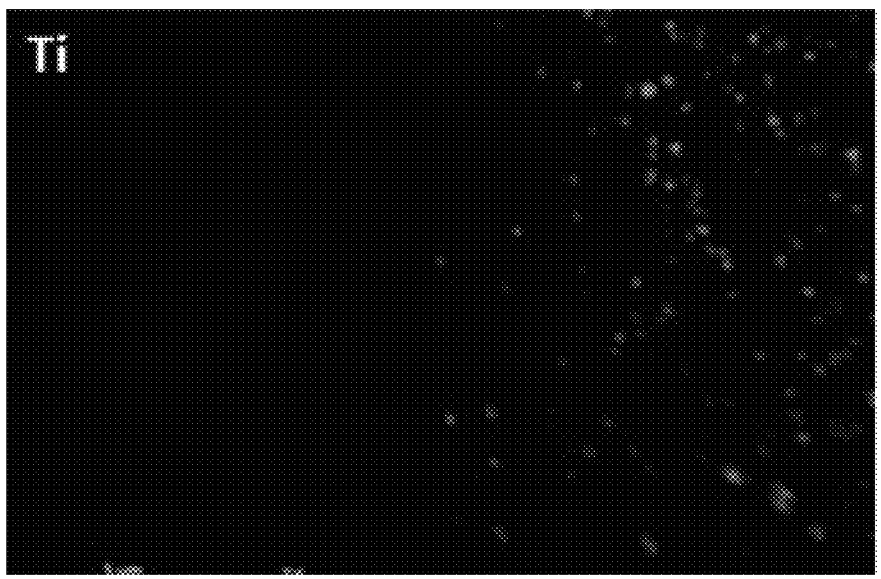
FIG. 4C is an elemental map across the region for Ti of Example G.
Figure 4D:
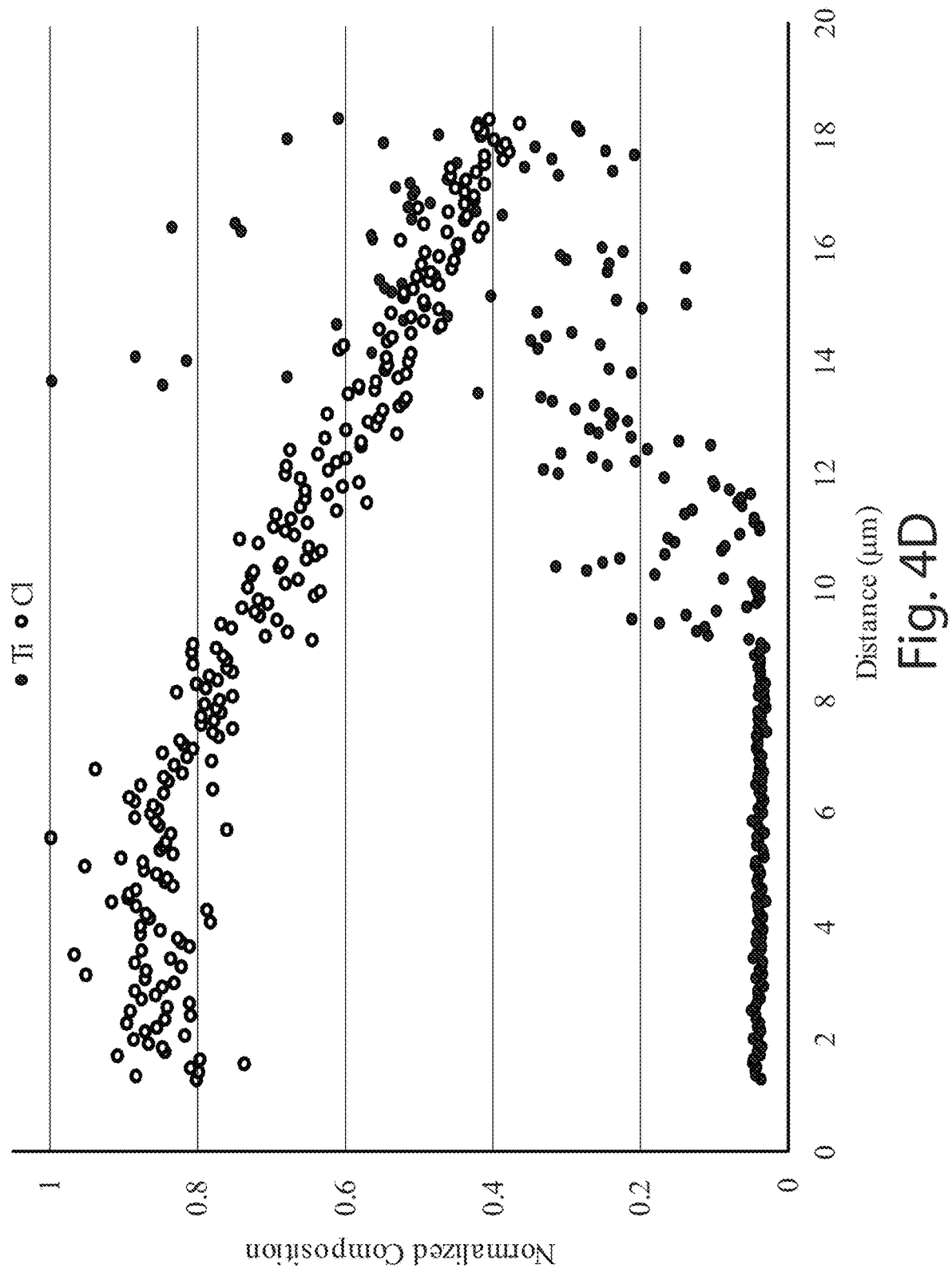
FIG. 4D is an EDS (Energy Dispersive X-ray Spectroscopy) line scan of Ti and Cl Kα of Example G.

FIGS. 4A-D indicate that there is an interface/tie layer in Example G. FIG. 4A is a high angle annular dark field (HAADF) STEM image at the A/C interface (tie layer) of Example G. FIG. 4B and FIG. 4C are elemental maps across the region for Cl and Ti. FIG. 4B shows that there is a high concentration of Cl that declines and FIG. 4C shows that there is a low level of Ti that increases. FIG. 4D is an EDS (Energy Dispersive X-ray Spectroscopy) line scan of Ti and Cl Kα. FIG. 4D shows that the Ti starts to increase as the Cl declines. The area where Ti and Cl are mixed indicates a tie layer.

Figure 5A:
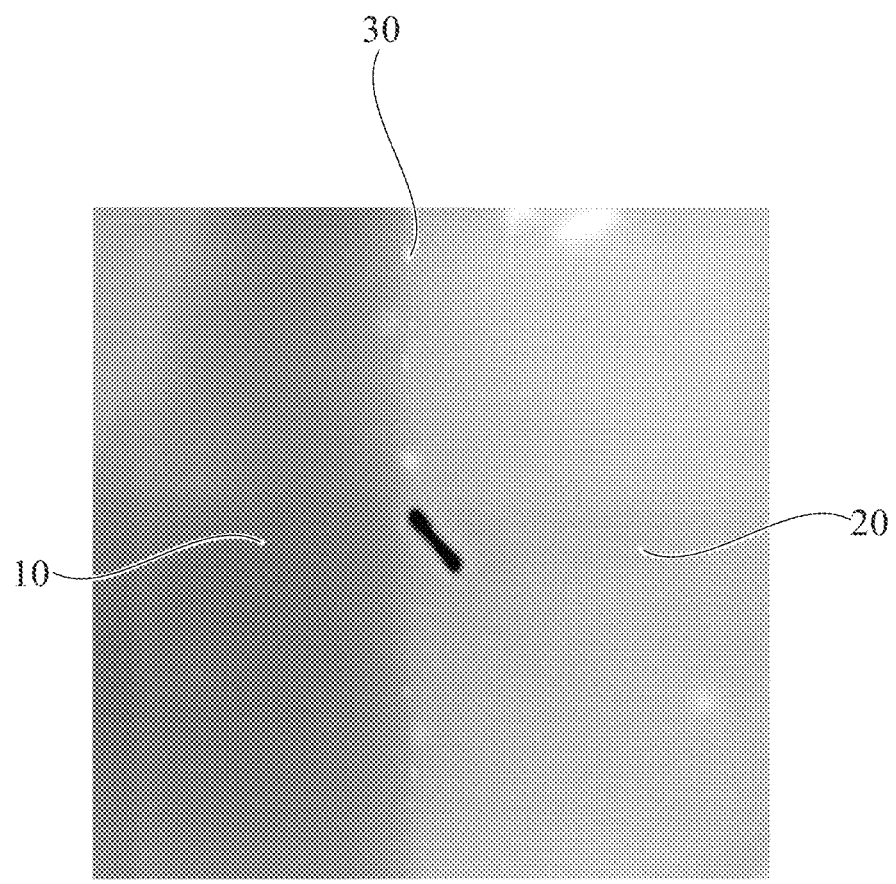
FIG. 5A is an STEM image showing the interface/tie layer of Example B.

The thickness of the tie layer for Example B (PET/Nylon/PET) was analyzed using Method A. FIG. 5A shows an STEM (scanning transmission electron microscopy) image showing the interface/tie layer 30 between the PET layer 10 and the nylon layer 20.

Figure 5B:
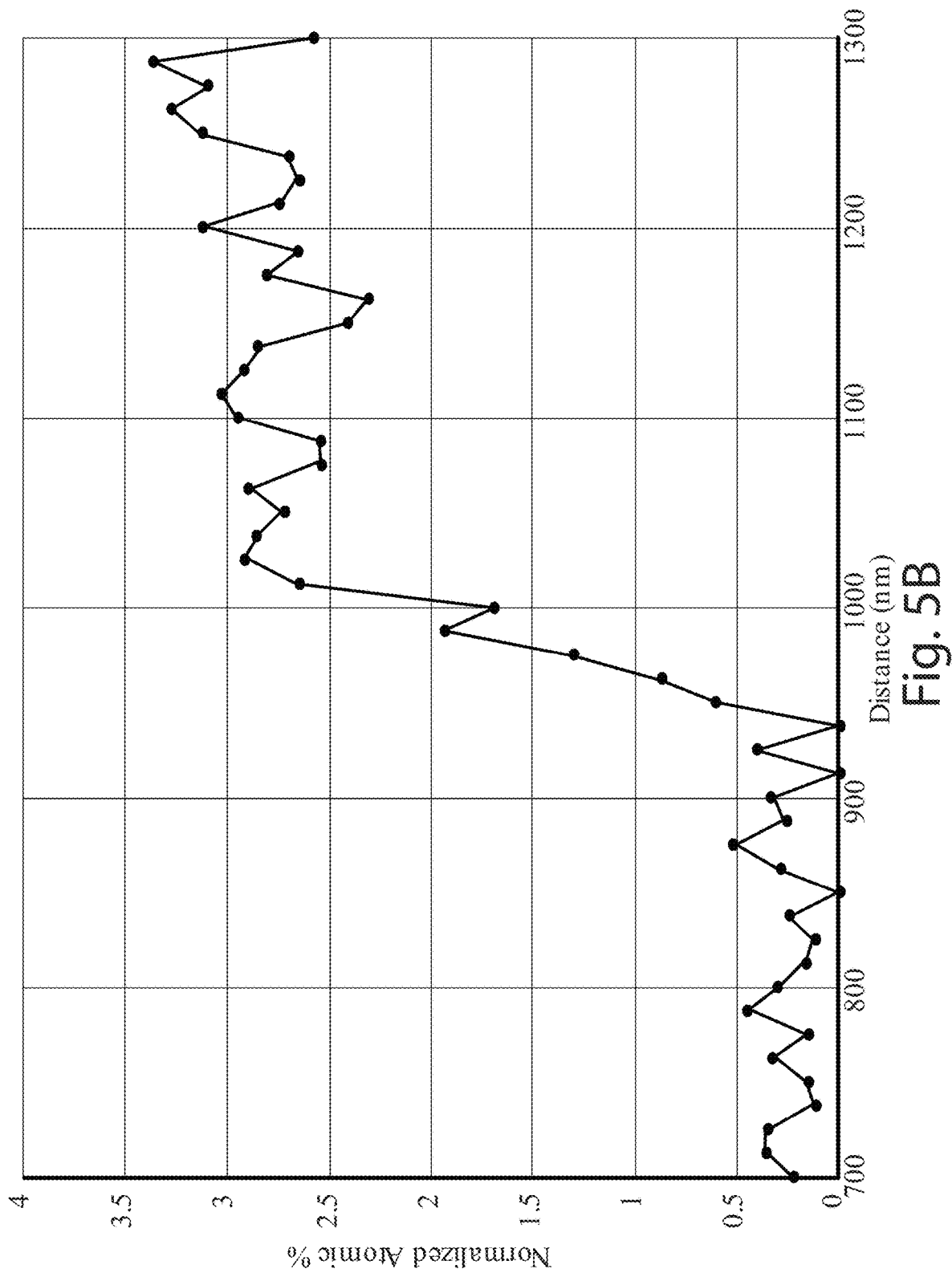
FIG. 5B shows a chart a chart representing an EDS line scan for N Kα of Example B.

For Example B, nitrogen was mapped/line scanned across the interface with EDS. FIG. 5B shows a chart representing an EDS line scan for N Kα. The line represents N Kα and shows that at a distance of 700 nm there is very little nitrogen (N) in the region (indicating the PET layer). As the EDS moves along the cross-section of the wall there is a steep transition indicating the tie layer where the PET and nylon are slightly mixed. After the steep transition there is more N present (indicating the nylon layer).

Figure 6:
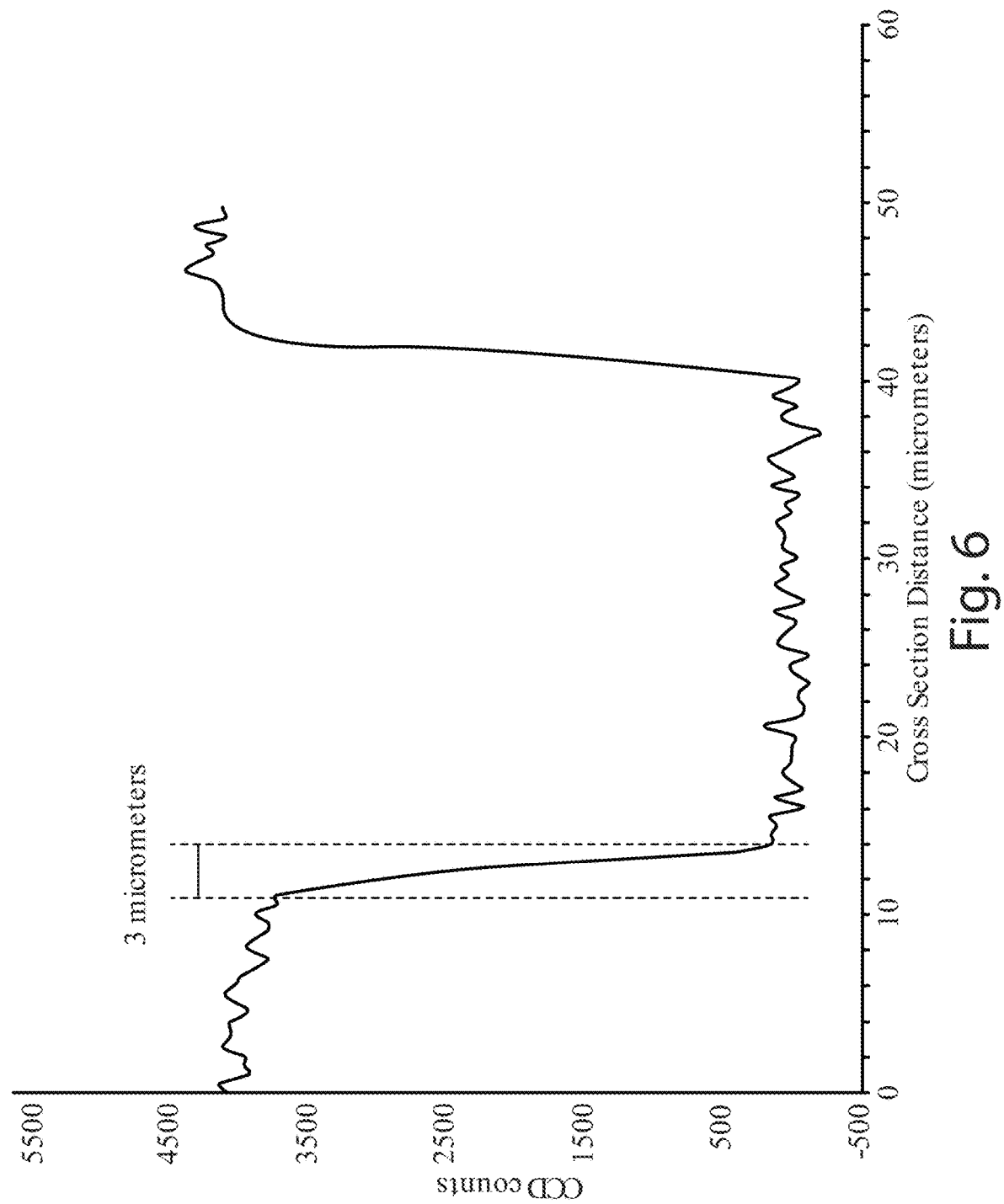
FIG. 6 is a confocal Raman micro-spectroscopy line scan across the cross-section of the wall in Example D.

The thickness of the tie layer for Example D (PET/PEN/PET) was analyzed using Method B. In FIG. 6 is a confocal Raman micro-spectroscopy line scan across the cross-section of the article wall using spectral features unique for PEN. FIG. 6 also shows the presence of a tie layer, which can be measured to about 3 microns, as indicated on the figure. Note, Table 3, above, shows a range from 2-4 μm, since multiple tie layer thicknesses were calculated and all fell between 2 and 4 μm.

To determine the type of failure between the A and C layer (e.g. adhesive failure, cohesive failure, or partial cohesive failure), samples A-G were flexed and peeled apart. The inner surface of the PET layer was mounted face and inspected by SEM and FIGS. 7A-D show these SEM images.

To take the images in FIG. 7A-D, the samples were prepared as follows: Regions of the bottle wall were removed by cutting out a large region with a utility knife, then cutting it further down to about 1×2 cm using a scissors or single edge teflon coated razor blade. The cutout portions are mounted with the outer bottle surface facing up on a standard SEM stub by affixing with double sided conductive tape (carbon or copper). The edges of the bottle piece are painted with a small amount of conductive paste (carbon or silver) to ensure good electrical contact to the SEM stub. The sample mounted on the stub is coated for about 100 with thin gold for by a good quality sputtering system such as the Denton Desk V (Denton Vacuum, Moorestown, NJ). The thickness of the coating is judged by one skilled in the art, but is generally less than 100 seconds at about 38 mA which is enough thickness to prevent charging but having as little impact on the surface texture as possible. The coated samples were imaged under high vacuum with a FEI Quanta 450 FEG at using between 2-5 kV accelerating voltage.

Figure 7B:
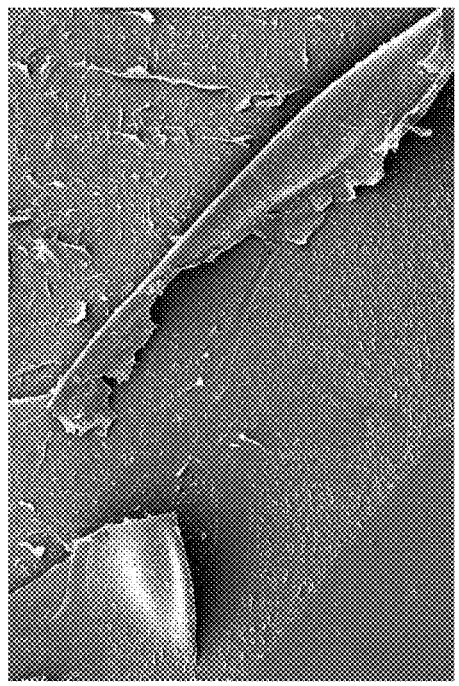
FIG. 7B is an SEM image of the PEN/PET surface of Example D.
Figure 7D:
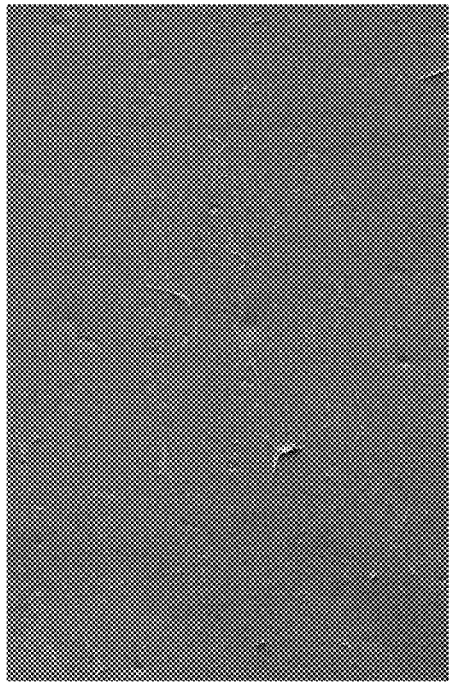
FIG. 7D is an SEM image of the Nylon/PET surface of Example B.
Figure 7A:
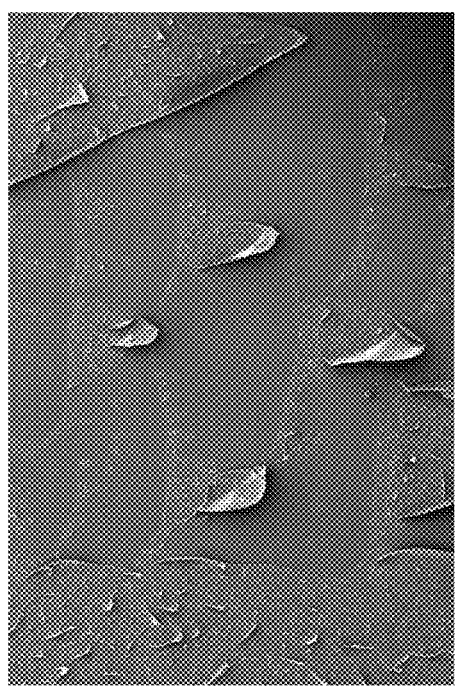
FIG. 7A is an SEM image of the COC/PET surface of Example C.

FIG. 7A is an SEM image of the COC/PET surface of Example C and FIG. 7B is an SEM image of the PEN/PET surface of Example D. FIGS. 7A and 7B show partial cohesive failure since there are regions of COC and PEN, respectively, still adhered to the PET surface.

Figure 7C:
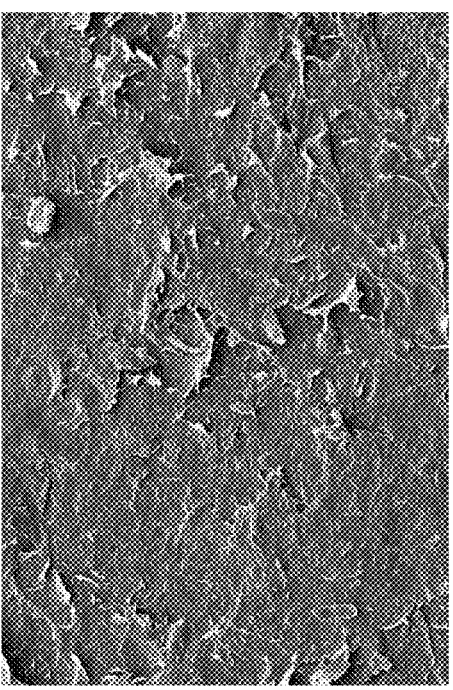
FIG. 7C is an SEM image of the LCP/PET surface of Example F.

FIG. 7C is an SEM image of the LCP/PET surface of Example F. The LCP/PET surface shows cohesive failure where the failure occurs within the LCP layer rather than at the PET/LCP/PET interfaces. Example F had one of the critical normal load (85.9 N) as compared to the other examples.

FIG. 7D is an SEM image of the Nylon/PET surface of Example B. The Nylon/PET surface shows a clean surface with no identifiable nylon regions still adhered to the PET. This was categorized as an adhesive failure. Example B had the lowest critical normal load (18.5 N) as compared to the other examples made with the ISBM (Examples C-G).

In some examples, layers A, B, and C are based on the same type of thermoplastic resin (e.g. PET). This can allow for a better interpenetration of the layers at the interface due to their chemical compatibility and a more robust wall. For "based on the same type of resin" it is meant that layers A, B and C comprise at least 50%, alternatively at least 70%, alternatively at least 90% of the same type of resin. For "same type" of resin it is intended resin from the same chemical class, i.e. PET, is considered a single chemical class. For example, two different PET resins with different molecular weight are considered to be of the same type including but not limited to PET and recycled PET. In another example, PE and PP are the same type. One PET and one PP resin are NOT considered of the same type. Different polyesters are also not considered of the same type.

Layers A, B and C may be formed by the same thermoplastic resin (e.g. PET) and may be different only for the type of colorants and pigments included.

Additional Optional Features

Articles according to the invention can comprise sub-layers with various functionalities. For example, a container may have a barrier material sub-layer or a recycled material sub-layer between an outer thermoplastic layer and an inner thermoplastic layer. Such layered containers can be made from multiple layer preforms according to common technologies used in the thermoplastic manufacturing field. Since barrier material sub-layers and recycled material sublayers can be used in layer A (when they do not impact transparency of the layer A), B or C. In some examples, they will be present as sub-layers of layers B or C and will be positioned toward the inner part of the container further away from layer A than the sub-layer comprising effect pigment which should be visible through layer A.

The article of the present invention may comprise, in any of its layers as long as the required properties of the layer are maintained, additives typically in an amount of from 0.0001%, 0.001% or 0.01% to about 1%, 5% or 9%, by weight of the article. Non-limiting examples of the adjunct ingredient include titanium dioxide, filler, cure agent, anti-statics, lubricant, UV stabilizer, anti-oxidant, anti-block agent, catalyst stabilizer, colorants, nucleating agent, and a combination thereof.

Another aspect of the present invention relates to a hollow preform which can be blow molded to make an article as described above. An hollow preform according to the invention is a preform for blow molding having a wall wherein the wall has an inside surface and an outside surface, the preform wall being formed in at least one region by three layers, a layer A' including the outside surface of the wall in that region, a layer B' including the inside surface of the wall in that region and a layer C' sandwiched between A' and B', wherein the three layers A', B' and C' together make up the entire wall of the preform in that region, said preform being obtained by parallel coinjection of two or more streams and wherein one or more streams make up layer A' and B' and the remaining streams make up layer C', wherein layer A' is transparent and layer C' comprises an effect pigment visible through layer A".

As apparent to a skilled person, such a preform once blow molded will form an article according to the invention having layers A, B, and C, wherein the layers of the preform will form the corresponding layers of the article i.e. A' will form A, B' will form B and C' will form C.

A person skilled in blow molding will know how to modify the compositions and structure of the preform so to achieve all the optional and preferred features of the articles of the invention described above. The present invention also relates to a method for making a preform for blow molding comprising the following steps:

a) providing a co-injection mold for making a preform
b) co-injecting at essentially the same time (parallel co-injection) two or more streams of molten resin thus forming a complete preform as described above, wherein one or more streams make up layer A' and B' and the remaining streams make up layer C', wherein layer A' is transparent and layer C' comprises an effect pigment visible through layer A'.

A preform obtained with this method can be subsequently blow molded, including stretch blow molded, so to obtain an article according to the invention.

In a further aspect the present invention relates to A blow molded article having a hollow body defined by a wall wherein the wall has an inside surface and an outside surface, the wall being formed in at least one region by 3 layers, a layer A including the outside surface of the wall in that region, a layer B including the inside surface of the wall in that region and a layer C sandwiched between layers A and B, the three layers A, B and C together making up the entire wall of the article in that region, wherein layer A is transparent and layer C comprises an effect pigment visible through layer A, and wherein said article in the region where layers A, B and C are present has a Critical Normal Load, according to the method described herein, higher than 50 N. As explained above such an articles can be manufactured by blow molding a preform made with a parallel flow co-injection process.

EXAMPLES

Several bottles were prepared, Ex. 1-3 are according to the invention, Ex. 4-9 are comparative examples. These examples are described in Table 4 to Table 6, below. In the example with three layers, layer A comprises the outer surface, layer B comprises the inner surface, and layer C is located between layers A and B.

TABLE 4

| | Examples | | |
|---|---|---|---|
| | Ex. 1 | Ex. 2 | Ex. 3 |
| Layer A | PET + 2% transparent orange masterbatch | PET + 3% transparent gold masterbatch | PET + 2% transparent green masterbatch |
| Layer C | PET + 4% White Pearl satin masterbatch | PET + 4% White Pearl satin masterbatch | PET + 4% White Pearl satin masterbatch |
| Layer B | PET + 2% transparent orange masterbatch | PET + 3% transparent gold masterbatch | PET + 2% transparent green masterbatch |
| Thickness of layer (μm) | A = 170 C = 160 B = 70 | A = 145 C = 60 B = 95 | A = 170 C = 160 B = 70 |
| Preform Technology | Parallel co-injection | Parallel co-injection | Parallel co-injection |

TABLE 5

| | Comparative Examples | | |
|---|---|---|---|
| | Ex. 4 | Ex. 5 | Ex. 6 |
| Layer A | PET + 5% opaque white masterbatch | PET + 2% transparent orange masterbatch | PET + 5% opaque white masterbatch |
| Layer C | PET + 4% opaque black masterbatch | PET + 4% White Pearl satin masterbatch | PET + 5% opaque black masterbatch |

TABLE 5-continued

Comparative Examples

|  | Ex. 4 | Ex. 5 | Ex. 6 |
|---|---|---|---|
| Layer B | PET + 5% opaque white masterbatch | | |
| Thickness of layer (μm) | A = 170<br>C = 160<br>B = 70 | A = 220<br>B = 145 | A = 220<br>B = 145 |
| Preform Technology | Parallel co-injection | 2 shot over-molding | 2 shot over-molding |

TABLE 6

Comparative Examples

|  | Ex. 7 | Ex. 8 | Ex. 9 |
|---|---|---|---|
| Layer | PET + 2% transparent green + 4% white pearl satin masterbatch | PET + 3% transparent green + 6% white pearl satin masterbatch | PET |
| Thickness of layer (μm) | 400 | 400 | 400 |
| Preform Technology | Parallel co-injection | Parallel co-injection | Parallel co-injection |

PET: Laser+® C (E60A) available from DAK Americas LLC

Orange Masterbatch: E-15796-2 Trans Orange Masterbatch (Clariant NE21760074)

White Pearl Satin Masterbatch: X-14413-1 WHITE PEARL SATIN #2 (Clariant, NE02760182)

Transparent gold masterbatch: E-15962-3 GOLD TONER V3 (Clariant NEG1760080)

Transparent green masterbatch: E-15795-4 TRANS GREEN (ClariantNE61760150)

Opaque White (Clariant Masterbatches, NE03642542)

Opaque Black (Clariant Masterbatches, NE94760019)

TABLE 7

Delamination Performance

| Sample | Critical Normal Load (N) | Scratch Depth at Region of Failure (μm) |
|---|---|---|
| Ex. 1 | 94.8 | 82 5 |
| Ex. 2 | 100 | 50 |
| Ex. 9 (comp.) | 70 | 65 |
| Ex. 5 (comp.) | 12.5 | 220 |

Delamination resistance is evaluated by measuring the Critical Normal Load in the three layers region using the method described below. A higher Critical Normal Load indicates a higher delamination resistance. The inventive examples 1 and 2 exhibit higher critical normal load to delaminate compared to Comparative Example 9 (monolayer of PET made with the same ISBM process) and Comparative Example 5 (bilayer made by 2 shot overmolding). This shows how the inventive structure is more resistant to delamination than an overmolded multilayer bottle and also than a single layer bottle. This evidences the importance of the improved adhesion among layers present in the bottles made with parallel flow coinjection process.

TABLE 8

Optical Performance

| Sample | Gloss 20° (GU) | Root square mean Roughness (Rq) μm | Haze | Haze Anisotropy | Peak Specular Reflectance (GU) | Reflection Softness (FW at 3/5 Height of Specular Profile) |
|---|---|---|---|---|---|---|
| Ex. 3 | 102 | 0.06 | 1.6 | 0.57 | 83.5 | 0.16 |
| Ex. 7 (comp.) | 28.1 | 0.80 | 52.4 | 1 | 4.6 | 4.28 |
| Ex. 8 (comp.) | 10.9 | 1.12 | 31.6 | 1 | 2.1 | 9.04 |

The data shows that inventive example 3 has less surface roughness, higher specular reflectance, higher gloss, lower haze, and lower reflection softness than the comparative examples 7 and 8, which are monolayer bottles with identical PET resin and pigmentation.

TABLE 9

Effect Pigment Transmittance

| Sample | Total Pigment Loading (%) | Average Panel Wall thickness (mm) | Total Luminous Transmittance | Opacity Index (1/Total Luminous Transmittance * Panel Wall Thickness * Pigment Loading) | Opacity Layer Index (1/Total Luminous Transmittance * Thickness of Pigment Layer * Pigment Loading) |
|---|---|---|---|---|---|
| Ex. 3 | 0.54 | 0.40 | 0.25 | 18.5 | 49.4 |
| Ex. 7 (comp.) | 0.75 | 0.43 | 0.49 | 6.3 | 6.3 |
| Ex. 8 (comp.) | 1.8 | 0.51 | 0.22 | 5.0 | 5.0 |

The data of the table above show that a bottle according to the invention is overall more opaque than a comparative monolayer bottle with the same pigments, pigment content and thickness. The pearl layer (which has the effect pigment) is intended to be opaque and the level of opacity corresponds to the effectiveness of the amount of pigment used. Without being bound by theory, we believe that this is the result of better orientation of the effect pigments (parallel to the plane of the article surface).

Test Methods

Method for Critical Normal Load (N) and Scratch Depth at Region of Failure

Samples with dimensions of 100 mm in length and about 50 mm in width are cut out from the main portion of the article wall. When the article does not allow taking a sample this large shorter samples in scale 1:2 width:length may be used. Smaller samples may lead to less precise measurement. The samples should be flat as possible or made flat by using a frame maintaining the sample flat at least in the region where the test scratch is done. For containers and bottles, the sample is preferably removed from the label panel of the bottle at least 50 mm away from shoulder/neck or base regions. The cutting is done with a suitable razor blade or utility knife such that a larger region is removed, then cut further down to a suitable size with a new single edge razor blade. If the sample readily delaminates upon removal from the bottle, the sample is given a score of 0 N for the "Critical Normal Load".

"Scratch Depth at Region of Failure" for such sample is measured as the thickness of the outer layer which has been delaminated. The thickness may be measured with a high accuracy digital micrometer such as a digital micrometer such as a Shinwa 79523 Digital Micrometer having an accuracy of +/−0.003 mm. Samples that remain intact, are subjected to scratch-induced damage using a Scratch 5 from Surface Machine Systems, LLC according to Scratch Test Procedures (ASTM D7027-13/ISO 19252:08) using a 1 mm diameter spherical tip, Initial Load: 1 N, End Load: 125 N, Scratch Rate: 10 mm/s, and Scratch Length of 100 mm. For samples smaller than 100 mm, the Scratch Length can be decreased while keeping the initial and end loads the same. This provides an estimate of the Critical Normal Load. Using this estimate, additional samples can be run over a more narrow load range to provide more accurate determination of the Critical Normal Load.

Scratch-induced damage is performed on both sides of the sample corresponding to the inner and outer surface of the bottle. It is critical that the sample is affixed to the sample stage by the use of foam-based double-sided tape such as Scotch® Permanent Mounting Tape by 3M (polyurethane double-sided high density foam tape with acrylic adhesive having a total thickness of about 62 mils or 1.6 mm, UPC #021200013393) on the underside of the sample. All samples are cleaned with compressed air before the scratch test.

The Point of Failure is visually determined after completing the scratch test as the distance across the length of the scratch at which the onset of visible delamination occurs. Delamination introduces an air gap between layers which is visible to the naked eye or with assistance of a stereomicroscope by one skilled in the art. This is validated based on a minimum three scratches per each side of the sample (defined as the cut out from bottle above) with a standard deviation of 10% or less. The side with lower Critical Normal Load is reported as the result of this method. The Scratch Depth at Region of Failure is measured according to ASTM D7027 across the scratch location at the point which the onset of delamination occurs. The Critical Normal Load (N) is defined as the normal load recorded at the location determined to be the Point of Failure. A Laser Scanning Confocal Microscope (KEYENCE VK-9700K) and VK-X200 Analyzer Software is used to analyze scratch-induced damage including the Point of Failure, Scratch Width, and Scratch Depth.

Average Panel Wall Thickness

Panel Wall Thickness is measured with a digital micrometer such as a Shinwa 79523 Digital Micrometer having an accuracy of +/−0.003 mm at least 2 locations of the panel wall from sections cut near the midpoint of the bottle height.

Layer Thickness

The layer thickness is measured via MicroCT scan method (described below) with image analysis where the effect pigment layer is defined as containing 95% of the pigment.

MicroCT Scan Method

Samples of the bottles to be tested are imaged using a microCT X-ray scanning instrument capable of scanning a sample having dimensions of approximately 5 mm×5 mm×3 mm as a single dataset with contiguous voxels. An isotropic spatial resolution of 1.8 μm is required in the datasets collected by microCT scanning. One example of suitable instrumentation is the SCANCO Systems model μ50 microCT scanner (Scanco Medical AG, Brüttisellen, Switzerland) operated with the following settings: energy level of 55 kVp at 72 μA, 3600 projections, 10 mm field of view, 1000 ms integration time, an averaging of 10, and a voxel size of 1.8 μm.

Test samples to be analyzed are prepared by cutting a rectangular piece of the plastic from the wall, preferably label panel region with an X-Acto® knife and then further trimming the sample to approx. 5 mm in width using a fine tooth X-Acto® saw with care to avoid causing cracks. The sample is positioned vertically with mounting foam material and placed into a plastic cylindrical scanning tube and secured inside the microCT scanner. The instrument's image acquisition settings are selected such that the image intensity contrast is sensitive enough to provide clear and reproducible discrimination of the sample structures from the air and the surrounding mounting foam. Image acquisition settings that are unable to achieve this contrast discrimination or the required spatial resolution are unsuitable for this method. Scans of the plastic sample are captured such that a similar volume of each sample with its caliper is included in the dataset.

Software for conducting reconstructions of the dataset to generate 3D renderings is supplied by the scanning instrument manufacturer. Software suitable for subsequent image processing steps and quantitative image analysis includes programs such as Avizo Fire 9.2 (Visualization Sciences Group/FEI Company, Burlington, Massachusetts, U.S.A.), and MATLAB version 9.1 with corresponding MATLAB Image Processing Toolbox (The Mathworks Inc. Natick, Massachusetts, U.S.A.). MicroCT data collected with a gray level intensity depth of 16-bit is converted to a gray level intensity depth of 8-bit, taking care to ensure that the resultant 8-bit dataset maintains the maximum dynamic range and minimum number of saturated voxels feasible, while excluding extreme outlier values.

Alignment of the sample surface such that it is parallel with the YZ plane of the global axis system is accomplished by one of the following ways including (a) using a fixture for the microCT that aligns the material correctly or (b) using software, such as Avizo, to visually align the surface and use interpolation to resample the dataset.

The analysis is performed on a processed microCT dataset that contains a square section of material approximately 1.5 mm×1.5 mm. The dataset goes border to border in the YZ direction. It completely intersects the minimum Y border, the maximum Y border, the minimum Z border and the maximum Z border. A small non-material buffer of region will exist between the minimum X border and the maximum X border. This region will consist of air or packing material. A material threshold is determined by executing Otsu's method on all the samples of interest and averaging the results. The material threshold should identify the bottle material while minimizing noise and packing material. The material threshold is applied to the aligned and trimmed dataset. Lines of voxel values, parallel to the x-axis, are acquired for every Y,Z value of the material dataset. A typical line will consist of a large continuous band of material which is the bottle. Smaller bands of material may also be present due to packing material used to hold the sample in place or due to noise. The position of the start and finish voxel of the largest band of material is recorded for each line. These positions are averaged together and give the edge of the material. The edge of the material may experience microCT defraction artifacts caused by the sudden change in density from air to polymer. These fringe effects may bring the edge voxel values high enough to be misclassified as pigment. To eliminate this effect, the material boundary, as determined by the average start and finish position, is moved inward by 10 voxels.

With the material boundaries established, each sample is once again processed by the Ostu's method to determine a threshold for the pigments. The average of all the sample thresholds is used to segment the pigment from the material. Each dataset is thresholded with the pigment threshold to generate a pigment dataset. Pigment voxels outside the material boundary are set to zero to remove any noise and fringe effects.

The number of pigment voxels on every YZ slice is calculated within the material. The slice totals are summed to a grand total. From these summations, bounding YZ slices are defined as those which enclose 95% of the pigment material. The distances from the material boundaries to the 95% pigment boundaries is reported as the layer thicknesses.

Gloss (GU)

Gloss is measured at 20°, 60°, and 85° geometries using a micro-TRI-gloss (BYK-Gardner GmbH) gloss meter according to ASTM D 2457/D523, ISO 7668/2813, and JIS Z8741. 60° is commonly used for intercomparing samples where samples higher than 70 are measured and recorded at 20°. For 60° gloss values of less than 10, the 85° geometry is commonly measured and recorded. For simplicity, all measurements reported are measured at 20°. All gloss measurements are done over black background which we refer to as "Base Black". Base Black is the black area from the X-Rite Grey Scale Balance Card (45as45 L*a*b* 21.077 0.15-0.29).

Root Mean Square Roughness (Rq) Suitable regions of the bottle wall are analyzed for Ra (arithmetical mean height) using a portable surface roughness tester such as the Surftest SJ-210 (Mitutoyo America Corporation) was placed at an even height of the bottle. The roughness is measured in units of microns.

Haze and Reflection Methods: Haze Anisotropy, Peak Specular Reflectance (GU), and Reflection Softness (FW at 3/5 Height of Specular Profile)

The haze reported here is also called reflected haze and it is measured with a haze meter/goniophotometer such as a Rhopoint IQ (20°/60°/85° Glossmeter, DOI Meter, Haze Meter, Goniophotometer, Rhopoint Instruments Limited) according to ASTM E430.

$$\text{Reflected Haze} = 100 \times (\Sigma \text{ Pixels from } 17° \text{ to } 19° \text{ (sample)} + \Sigma \text{ Pixels from } 21° \text{ to } 23° \text{ (sample)}) / \text{Specular Gloss (Standard)}$$

The Haze Anisotropy is the ratio of haze (ie. reflected haze) measured for bottle samples when oriented parallel with the bottle height versus haze measured upon rotating the sample by 90°.

The Peak Specular Reflectance is measured at 20° with a diode array covering +/−7.25° from the specular angle in steps of 0.028°. Reflection Softness is measured from the Specular Profile (+/−5.6° from Specular Angle in Gloss Units) as the full width (FW) at 3/5 of the peak height for the specular profile peak.

Total Luminous Transmittance

Luminous transmittance is measured using a Ci7800 benchtop sphere spectrophotometer (X-Rite) using D65 illumination. The total luminous transmittance is measured in accordance with ASTM D1003.

Chroma, Lightness and Hue (C*, L*, h°)

Reflected color characteristics of C*, L*, h° are measured using a Multi-Angle Spectrophotometer such as the MA98 from X-Rite Incorporated in accordance with ASTM E 308, ASTM E 1164, ASTM E 2194, and ISO 7724. The samples are placed over a black background which is referred to as "Base Black". The "Base Black" is the black area from the X-Rite Grey Scale Balance Card (45as45 L*a*b* 21.077 0.15-0.29).

Figure 8:
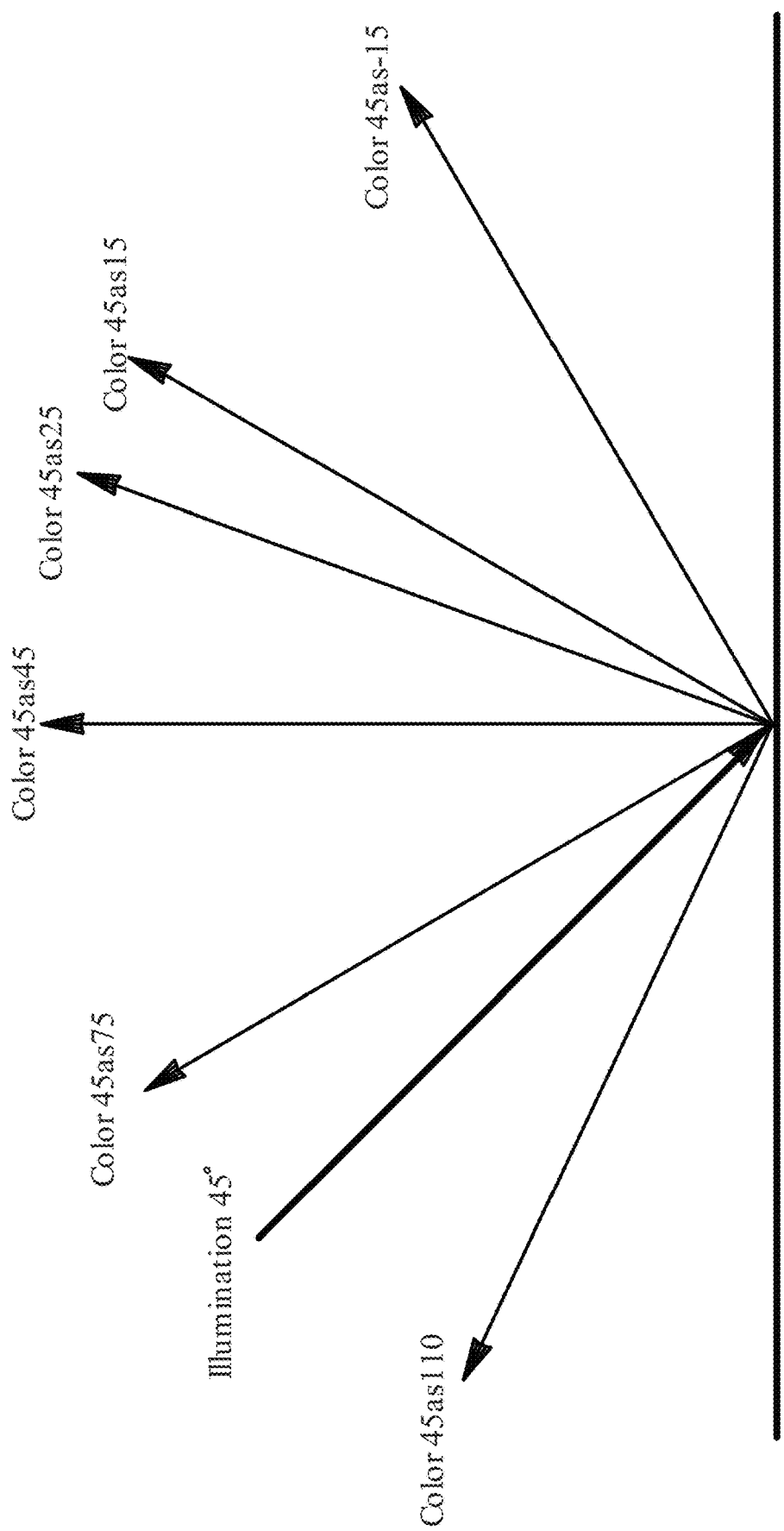
FIG. 8 describes the measurement naming system used to determine the $C^*$, $L^*$, and $h°$ when at different viewing angles when illuminated at 45°.

The samples are measured with CIE Standard Illuminant D65/10° illumination. The measurement naming system used here is written where the first angle provided is the illumination angle as defined from the surface normal and the second angle is the a specular detection angle. This is further described in FIG. 8.

C*, L*, and h° are coordinates of the CIELCH Color System where C*=Chroma, L*=Lightness, and h°=Hue angle. Chroma describes the vividness or dullness of a color where higher values correspond to a saturated color appearance and lower values correspond to duller/less saturated color. Chroma is also known as saturation.

Lightness is a measure of lightness/darkness value where higher values correspond to lighter appearance and lower values correspond to darker appearance.

Hue is an attribute of a color by virtue of which it is discernible as red, green, etc., and which is dependent on its dominant wavelength, and independent of intensity or lightness.

Tie Layer Thickness (Interface Layer Thickness):

Method A: Energy Dispersive X-Ray Spectroscopy (EDS) Mapping Method for Adjacent Layers Having Unique Elemental Composition by Virtue of the Resins (e.g. PET/Nylon) or Colorants/Additives.

Method A may be used if the bottle sample (preparation of the bottle sample is described below) will contain colorants and/or additives at or above 2 wt. % having elemental compositions which may be suitably mapped by EDS (e.g. elements higher than atomic number 3 not including carbon or oxygen). These colorants/additives can be molecular species or particulates. If they are particulate in form, they should be well dispersed such that there are about 10 or more particles within a 5 μm×5 μm×200 nm volume. Generally, the particles should be less than 500 nm in the largest dimension.

Sample Preparation:

A piece of the bottle label panel wall at least 50 mm away from shoulder/neck or base regions measuring ~3 cm×3 cm is extracted using a heated blade. The heated blade enables sectioning of the bottle without applying large amounts of force which may induce premature delamination. This accomplished by melting the panel wall material rather than cutting. The melted edges of the piece are removed with scissors, then the ~3 cm×3 cm piece is further sectioned into several pieces measuring approximately 1 cm×0.5 cm, using a new sharp single edge razor blade. The cutting force is applied along the length of the piece, parallel to the layers/interfaces, rather than perpendicular to the interface to prevent smearing across the interface.

Then, the ~1 cm×0.5 cm pieces are then hand polished, edge-on, producing a polished surface which displayed the cross-section of the bottle wall and the layered structure. The initial polishing consists of using SiC papers, with progressively smaller grit sizes (400, 600, 800, and then 1200) while using distilled water as a lubricant/coolant. The 1200 grit polished surface is then further polished, using 0.3 μm Al$_2$O$_3$ polishing media, with distilled water being used as lubricant. The polished samples are then ultrasonically cleaned in a solution of detergent+distilled water, for 1 min, followed by three additional rounds of ultrasonic cleaning in fresh distilled water, to rinse the detergent from the sample. A final ultrasonic cleaning is performed in ethanol for 2 min. The polished and cleaned samples are mounted on a SEM stub with double sided carbon tape with the edge-on side up, then coated with approximately 1020 nm of carbon, as deposited by carbon evaporator such as a Leica EM ACE600 (Leica Microsystems).

Identification of the Approximate Interface by SEM:

Identification of the approximate interface between A/C or C/B layers is necessary in order to allow finding the interface in the dual-beam FIB. To identify the approximate interface, SEM imaging and EDS mapping is performed by a modern field emission SEM such as a FEI (Thermo Scientific®) Apreo SEM equipped with a silicon drift EDS detector (SDD) such as an EDAX Octane Elect 30 mm$^2$ SDD (EDAX Inc.). A preliminary EDS map at about 500 to 1000× magnification is collected across the cross-sectional plane to confirm the presence of the layered structure by identifying the unique elements present in each layer. The accelerating voltage is suitably set in order to ionize the most ideal electron shell of the elements of interest in order to generate an X-ray signal. USP<1181> (USP29-NF24) provides a useful reference for choosing the best operating conditions to collect the EDS signal.

The EDS map is used to show the approximate location of the interface between the layers, after which platinum fiducial markers are deposited via e-beam deposition, using a gas injection system (GIS), to mark the location of the interface. Another, EDS map is collected, with the Pt fiducial markers, to confirm their location with respect to the interface.

Dual-Beam FIB Sample Preparation:

A thin foil sample (100-200 nm thick) is required to map the interface at suitably high resolution. The lamella is prepared using a modern dual beam FIB such as an FEI (Thermo Scientifc®) Helios 600. The interface is located in the FIB with the aid of the platinum fiducial markings. A protective platinum cap is then deposited on the area of interest at the interface in the FIB, measuring approximately 30 μm×2 μm×2 μm. This is done to protect the material, which will become the lamella sample, from unnecessary damage from the ion beam. The 30 μm dimension is oriented perpendicular to the interface such that approximately 15 μm covers one side of the interface and 15 μm covers the other side. Material is then removed from each side of the platinum cap, leaving the capped region as a lamella, measuring approximately 30 μm wide×2 μm thick×10 μm deep where the interface is oriented parallel to the 10 μm direction. The lamella is then extracted, with the aid of an Omniprobe nanomanipulation device (Oxford Instruments), and attached to a copper Omniprobe grid. The lamellar sample is then thinned, using 30 kV gallium ions, until sufficiently thin (~500-200 nm). The newly-thinned lamellar sample is then cleaned with 5 kV gallium ions, to remove excess damage caused by the 30 kV thinning process.

STEM Data Collection:

Scanning transmission electron microscopy (STEM) Energy Dispersive X-ray Spectroscopy (EDS) data is collected using a modern field emission TEM such as a FEI Tecnai TF-20 (Thermo Scientific®) equipped with a modern silicon drift EDS detector (SDD) such as an EDAX Apollo XLT2 30 mm$^2$ SDD detector (EDAX Inc.) with collection and analysis software such as Apex™ (EDAX Inc.). The interface region from within the foil produced as described above is mapped with EDS to display the presence and location of the elemental constituents in the two polymer layers. The size of the EDS map is about 20×10 μm where the interface is perpendicular to the 20 μm direction ("Y" direction) and parallel to the 10 μm direction ("X" direction). The "Y" and "X" directions are perpendicular or almost perpendicular to each other.

The map is collected by using between 200 to 300 kV accelerating voltage and a beam current at or between 100 pA and 1 nA to achieve SDD count rate of at least 3,000 counts per second. The map resolution is at least 256×160 pixels with a dwell time of about 200 us per pixel. About 200 frames are collected for a total map time of about 30 minutes. The elements of interest are selected and a standardless automatic ZAF analysis method such as the P/B-ZAF fundamental parameter analysis is selected to enable quantitative mapping.

Data Processing:

The EDS map data can be displayed as color-coded images, with a unique color corresponding to each element. The intensity of the color is scaled with the concentration of the elemental species. The EDS map data is processed to display a line profile of normalized atom % by summing the X-ray counts for each element as they occur in the "Y" direction (parallel to the interface) and the summed intensities are plotted as a function of distance across the interface in the "X" direction (normal to the interface). The distance between the maximum and minimum normalized atom % (both having about zero slope across about 2-4 microns) for at least one element is defined as the interface layer thickness.

Method B: Confocal Raman Spectroscopy Mapping Method for Adjacent Layers Having Unique Spectral Characteristics by Virtue of the Resins (e.g. PET/COC) or Colorants/Additives.

2D Chemical maps or line scans are collected across the layer interface using a confocal Raman microscope (Witec A300R Confocal Raman spectrometer) equipped with a continuous laser beam, motorized x-y sample scanning stage, video CCD camera, LED white-light source, diode-pumped laser excitations from 488 nm to 785 nm, and 50× to 100× (Zeiss EC Epiplan-Neofluar, NA=0.8 or better) microscope objectives.

Samples are prepared in a similar manner as described in Method A—Sample Preparation section, however the samples are uncoated.

The sample is mounted on a glass microscope slide with edge-on side up. An area of interest near the layer interface is located with the aid of the video CCD camera using the white-light source. From the area of interest, 2D Chemical maps via spectral acquisition are acquired by focusing the laser beam at or below the surface and scanning across the layer interface in the X-Y direction with steps of 1 μm or lower, with integration time lower than Is at each step. The integration time should be adjusted to prevent saturation of the detector. Raman images are generated using a suitable software such as the WItec™ Project Five (Version 5.0) software using spectral features unique to each polymer layer such as peak intensities, integrated areas, peak widths, and/or fluorescence. The full Raman spectral data at each pixel in the data set is corrected for cosmic rays and baseline corrected prior to image generation. To determine intermixing between polymer layers, a cross section analysis wherein the spectral features used to generate the chemical map are followed along a line drawn across the interface including at least 10 microns within area that covers the polymer layers of interest. The defined spectral features are plotted against distance in micrometers. The interlayer mixing distance (i.e. tie layer) is defined as the distance between the maximum and minimum values of the spectral features.

Combinations
- A. A blow molded article comprising a hollow body defined by a wall wherein the wall has an inside surface and an outside surface, the wall being formed in at least one region by 3 layers, a layer A including the outside surface of the wall in that region, a layer B including the inside surface of the wall in that region and a layer C sandwiched between layers A and B, said article being obtained by blow molding of a preform made via parallel flow coinjection of about 2 or more streams and wherein one or more streams make up layers A and B and the remaining streams make up layer C, wherein layer C comprises a pigment visible through layer A and wherein there is a tie layer between layer A and C wherein the layers are slightly interpenetrated.
- B. The article according to paragraph A, wherein layer A comprises a thickness and layer B comprises a thickness and the thickness of layer A is greater than the thickness of layer B.
- C. The article according to any of the preceding paragraphs, wherein the article further comprises a front side that is non-planar.
- D. The article according to any of the preceding paragraphs, wherein layer B is made of the same material as layer A.
- E. The article according to any of the preceding paragraphs, wherein the article is a container, preferably a bottle.
- F. The article according to any of the preceding paragraphs, wherein a wall in the region where layers A, B and C are present comprises a Critical Normal Load, measured according to the method described herein, higher than 30 N, preferably higher than 50 N.
- G. The article according to any of the preceding paragraphs, wherein said region formed by three layers comprises more than about 60%, preferably more than about 80%, more preferably more than 90% of the article weight.
- H. The article according to any of the preceding paragraphs, wherein the pigment in layer C comprises an effect pigment comprising a pearlescent pigment.
- I. The article according to paragraph H, wherein the effect pigment is about 0.01% to about 5% wt of layer C.
- J. The article according to paragraph H-I, wherein the effect pigment comprises platelet-like pigments with a face wherein the pigments are primarily oriented so that the face is parallel to the outside surface of the article.
- K. The article according to any of the preceding paragraphs, wherein layer C is made of more sublayers wherein at least the sublayer forming the surface of layer C which faces the corresponding surface of layer A, comprises effect pigments.
- L. The article according to any of the preceding paragraphs, wherein the thickness of the article wall in the region formed by 3 layers is from about 0.2 to about 5 mm, and wherein preferably layer C has a thickness which is between about 5 and about 40% of the total thickness.
- M. The article according to any of the preceding paragraphs, wherein the article comprises more than about 50 wt %, preferably more than about 70 wt %., more preferably more than about 80 wt %., even more preferably more than about 90 wt %. of thermoplastic resins selected from a group consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), low-density polyethylene (LDPE), linear low-density polyethylene (LLPDE), high-density polyethylene (HDPE), propylene (PP) and a combination thereof.
- N. The article according to any of the preceding paragraphs, wherein the article has a non-cylindrical shape.
- O. A blow molded article having a hollow body defined by a wall wherein the wall has an inside surface and an outside surface, the wall being formed in at least one region by 3 layers, a layer A including the outside surface of the wall in that region, a layer B including the inside surface of the wall in that region and a layer C sandwiched between layers A and B, the three layers A, B and C together making up the entire wall of the article in that region, wherein layer A is transparent and layer C comprises an effect pigment visible through layer A, and wherein said article in the region where layers A, B and C are present has a Critical Normal Load, according to the method described herein, higher than about 50 N.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A blow molded article comprising a hollow body defined by a wall wherein the wall has an inner surface and an outer surface, the wall being formed in at least one region by 3 layers, a layer A including the outer surface of the wall in that region, a layer B including the inner surface of the wall in that region and a layer C sandwiched between layers A and B, said article being obtained by blow molding of a preform made via parallel flow co-injection of about 2 or more streams resulting in mixing of the streams; wherein one or more streams make up layers A and B and the remaining streams make up layer C, wherein the layer C comprises a pigment visible through layer A; wherein between layers A and C and layers B and C there is a transition layer created by the mixing where the layers are interpenetrated; wherein the wall in the region where layers A, B and C are present comprises a Critical Normal Load greater than 30 N.

2. The article according to claim 1, wherein a wall in the region where layers A, B and C are present comprises a Critical Normal Load greater than 50 N.

3. The article according to claim 1, wherein layer A comprises a thickness and layer B comprises a thickness and the thickness of layer A is greater than the thickness of layer B.

4. The article according to claim 1, wherein the article further comprises a front side that is non-planar.

5. The article according to claim 1, wherein layer C comprises an effect pigment.

6. The article according to claim 5, wherein the effect pigment is about 0.01 wt. % to about 5 wt. % of layer C.

7. The article according to claim 6, wherein the effect pigment comprises platelet shaped pigments with a face wherein the pigments are primarily oriented so that the face is parallel to the outer surface of the article.

8. The article according to claim 1 wherein layer A is transparent and colored and layer C includes opacifying pigments.

9. The article according to claim 1, wherein said region formed by three layers comprises more than 90% of the article weight.

* * * * *